United States Patent
Steele, Jr.

(10) Patent No.: US 6,993,549 B2
(45) Date of Patent: Jan. 31, 2006

(54) SYSTEM AND METHOD FOR PERFORMING GLOATING POINT OPERATIONS INVOLVING EXTENDED EXPONENTS

(75) Inventor: Guy L. Steele, Jr., Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 626 days.

(21) Appl. No.: 10/035,581

(22) Filed: Dec. 28, 2001

(65) Prior Publication Data

US 2003/0041081 A1    Feb. 27, 2003

Related U.S. Application Data

(60) Provisional application No. 60/293,173, filed on May 25, 2001.

(51) Int. Cl.
*G06F 5/01* (2006.01)
*G06F 7/52* (2006.01)

(52) U.S. Cl. ........................... 708/495; 708/498
(58) Field of Classification Search ............... 708/495, 708/498, 496, 503
See application file for complete search history.

(56) References Cited

U.S. PATENT DOCUMENTS

| | | |
|---|---|---|
| 3,725,649 A | 4/1973 | Deerfield |
| 4,777,613 A | 10/1988 | Shahan et al. |
| 4,788,655 A | 11/1988 | Nakayama et al. |
| 4,991,131 A | 2/1991 | Yeh et al. |
| 5,065,352 A | 11/1991 | Nakano |
| 5,126,963 A | 6/1992 | Fukasawa |
| 5,161,117 A | 11/1992 | Waggener, Jr. |
| 5,249,149 A | 9/1993 | Cocanougher et al. |
| 5,307,303 A | 4/1994 | Briggs et al. |
| 5,347,481 A | 9/1994 | Williams ..................... 364/748 |
| 5,347,482 A | 9/1994 | Williams ..................... 364/757 |
| 5,357,237 A | 10/1994 | Bearden et al. |
| 5,363,321 A | 11/1994 | Dao Trong et al. |
| 5,365,465 A | 11/1994 | Larson |
| 5,481,489 A | 1/1996 | Yanagida et al. |
| 5,570,310 A | 10/1996 | Smith |
| 5,666,301 A | 9/1997 | Makino |
| 5,748,516 A | 5/1998 | Goddard et al. |
| 5,812,439 A | 9/1998 | Hansen |
| 5,862,066 A | 1/1999 | Rossin et al. |
| 5,892,697 A | 4/1999 | Brakefield |

(Continued)

OTHER PUBLICATIONS

U.S. Appl. No. 10/028,375, filed Dec. 28, 2001, Steele. Jr.

(Continued)

*Primary Examiner*—D. H. Malzahn
(74) *Attorney, Agent, or Firm*—Finnegan, Henderson, Farabow, Garrett, & Dunner, L.L.P.

(57) ABSTRACT

An extended exponent floating point unit performs an extended exponent floating point operation on a plurality of operands to produce a product of the plurality of operands. The extended exponent floating point unit groups the plurality of operands into at least one group, determines a plurality of scale factors for the plurality of operands, respectively, and provides a running sum of the plurality of scale factors. The extended exponent floating point unit further scales the plurality of operands to obtain a plurality of scaled operands, multiplies the plurality of scaled operands to obtain a group product, and scales the group product to obtain a scaled group product. The scaled group product is adjusted based on the running sum. The plurality of operands are grouped such that when all the plurality of scaled operands in the at least one group are multiplied an overflow or underflow will not occur.

23 Claims, 13 Drawing Sheets

U.S. PATENT DOCUMENTS

| | | | |
|---|---|---|---|
| 5,931,943 | A | 8/1999 | Orup |
| 5,953,241 | A * | 9/1999 | Hansen et al. ............... 708/501 |
| 5,963,461 | A | 10/1999 | Gorshtein et al. |
| 5,978,901 | A | 11/1999 | Luedtke et al. |
| 5,995,991 | A | 11/1999 | Huang et al. |
| 6,009,511 | A | 12/1999 | Lynch et al. ................. 712/222 |
| 6,049,865 | A | 4/2000 | Smith |
| 6,105,047 | A | 8/2000 | Sharangpani et al. |
| 6,108,772 | A | 8/2000 | Sharangpani |
| 6,131,106 | A | 10/2000 | Steele, Jr. ................... 708/510 |
| 6,138,135 | A | 10/2000 | Karp |
| 6,151,669 | A | 11/2000 | Huck et al. |
| 6,189,094 | B1 | 2/2001 | Hinds et al. |
| 6,205,460 | B1 | 3/2001 | Steele, Jr. |
| 6,256,655 | B1 | 7/2001 | Ezer et al. |
| 6,360,189 | B1 | 3/2002 | Hinds et al. |
| 6,393,555 | B1 | 5/2002 | Meier et al. |
| 6,490,607 | B1 | 12/2002 | Oberman |
| 6,594,681 | B1 | 7/2003 | Prabhu |
| 6,629,120 | B1 | 9/2003 | Walster et al. |
| 6,658,443 | B1 | 12/2003 | Walster |
| 6,658,444 | B1 | 12/2003 | Walster et al. |
| 6,697,832 | B1 | 2/2004 | Kelley et al. |
| 6,732,134 | B1 * | 5/2004 | Rosenberg et al. ......... 708/495 |
| 6,789,098 | B1 | 9/2004 | Dijkstra |
| 2002/0194232 | A1 | 12/2002 | Walster |
| 2003/0033335 | A1 | 2/2003 | Walster |

OTHER PUBLICATIONS

U.S. Appl. No. 10/035,579, filed Dec. 28, 2001, Steele, Jr.
U.S. Appl. No. 10/035,580, filed Dec. 28, 2001, Steele, Jr.
U.S. Appl. No. 10/035,582, filed Dec. 28, 2001, Steele, Jr.
U.S. Appl. No. 10/035,583, filed Dec. 28, 2001, Steele, Jr.
U.S. Appl. No. 10/035,584, filed Dec. 28, 2001, Steele, Jr.
U.S. Appl. No. 10/035,585, filed Dec. 28, 2001, Steele, Jr.
U.S. Appl. No. 10/035,586, filed Dec. 28, 2001, Steele, Jr.
U.S. Appl. No. 10/035,587, filed Dec. 28, 2001, Steele, Jr.
U.S. Appl. No. 10/035,589, filed Dec. 28, 2001, Steele, Jr.
U.S. Appl. No. 10/035,595, filed Dec. 28, 2001, Steele, Jr.
U.S. Appl. No. 10/035,647, filed Dec. 28, 2001, Steele, Jr.
U.S. Appl. No. 10/035,674, filed Dec. 28, 2001, Steele, Jr.
U.S. Appl. No. 10/035,741, filed Dec. 28, 2001, Steele, Jr.
U.S. Appl. No. 10/035,746, filed Dec. 28, 2001, Steele, Jr.
U.S. Appl. No. 10/035,747, filed Dec. 28, 2001, Steele, Jr.
U.S. Appl. No. 10/036,133, filed Dec. 28, 2001, Steele, Jr.
Title: "Safe Treatment of Overflow and Underflow Conditions", by Robert A. Fraley & J. Stephen Walther, Hewlett-Packard Co., pp. 1-5.
Title: "Vax Floating Point: A Solid Foundation for Numerical Computation", by Mary Payne & Dileep Bhandarkar, Digital Equipment Corp., pp. 1-12.
Title: Lecture Notes on the Status of "IEEE Standard 754 for Binary Floating-Point Arithmetic", by Prof. W. Kahan, May 31, 1996, pp. 1-30.
Title: "Interval Arithmetic Specification" by Dmitri Chiriaev & G. William Walster, Draft revised May 4, 1998, pp. 1-78.
Title: "IEEE Standard for Binary Floating-Point Arithmetic IEEE Standard 754-1985," by Standards Committee of the IEEE Computer Society, The Institute of Electrical and Electronics Engineers, Inc., copyright 1985, pp. 1-14.
U.S. Appl. No. 10/320,547, filed Dec. 17, 2002, Steele, Jr.
U.S. Appl. No. 10/320,450, filed Dec. 17, 2002, Steele, Jr.

* cited by examiner

SYSTEM AND METHOD FOR PERFORMING GLOATING POINT OPERATIONS INVOLVING EXTENDED EXPONENTS

Applicant claims the right of priority based on U.S. Provisional Patent Application No. 60/293,173 filed May 25, 2001 in the name of Guy L. Steele, Jr.

RELATED APPLICATIONS

U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, is hereby incorporated by reference.

U.S. patent application Ser. No. 10/035,589, filed on even date herewith in the name of Guy L. Steele Jr. and entitled "Floating-Point Computation with Detection and Representation of Inexact Computations Without Flags or Traps," assigned to the assignee of the present application, is hereby incorporated by reference.

U.S. patent application Ser. No. 10/035,595, filed on even date herewith in the name of Guy L. Steele Jr. and entitled "Floating Point Adder With Embedded Status Information," assigned to the assignee of the present application, is hereby incorporated by reference.

U.S. patent application Ser. No. 10/035,580, filed on even date herewith in the name of Guy L. Steele Jr. and entitled "Floating Point Multiplier With Embedded Status Information," assigned to the assignee of the present application, is hereby incorporated by reference.

U.S. patent application Ser. No. 10/035,647, filed on even date herewith in the name of Guy L. Steele Jr. and entitled "Floating Point Divider With Embedded Status Information," assigned to the assignee of the present application, is hereby incorporated by reference.

DESCRIPTION OF THE INVENTION

1. Field of the Invention

The invention relates generally to systems and methods for performing floating point operations, and more particularly, to systems and methods for performing floating point operations involving extended exponents.

2. Background of the Invention

IEEE Standard 754 (hereinafter "IEEE Std. 754" or "the Standard") published in 1985 by the Institute of Electrical and Electronic Engineers, and adopted by the American National Standards Institute (ANSI), defines several standard formats for expressing values as a floating point number. In accordance with IEEE Std. 754, a floating point format is represented by a plurality of binary digits, or "bits," having the structure:

$$se_{msb} \ldots e_{lsb}f_{msb} \ldots f_{lsb}$$

where "msb" represents "most significant bit" and "lsb" represents "least significant bit." The bit string comprises a sign bit, s, which indicates whether the number is positive or negative. The bit string further comprises an exponent field having bits $e_{msb} \ldots e_{lsb}$ representing a biased exponent, e. Still further, the bit string comprises a fraction field having bits $f_{msb} \ldots f_{lsb}$ representing a fraction field of a significand. A significand comprises an explicit or implicit leading bit to the left of an implied binary point and a fraction field to the right of the implied binary point.

IEEE Std. 754 defines two general formats for expressing a value, namely, a "single" format, which comprises thirty-two bits, and a "double" format, which comprises sixty-four bits. In the single format, there is one sign bit, s, eight bits, $e_7 \ldots e_0$, comprising the exponent field, and twenty-three bits, $f_{22} \ldots f_0$, comprising the fraction field. In the double format, there is one sign bit, s, eleven bits, $e_{10} \ldots e_0$, comprising the exponent field, and fifty-two bits, $f_{51} \ldots f_0$, comprising the fraction field.

The value of a number represented in accordance with IEEE Std. 754 is determined based on the bit patterns of the exponent field bits, $e_{msb} \ldots e_{lsb}$, and the fraction field bits, $f_{msb} \ldots f_{lsb}$, both for the single and double formats. The value of a number represented in accordance with IEEE Std. 754 is positive or negative infinity, depending on the value of the sign bit, s, if the exponent field bits, $e_{msb} \ldots e_{lsb}$, are all binary ones (that is, if the bits represent a binary-encoded value of "255" in the single format or "2047" in the double format) and the fraction field bits, $f_{msb} \ldots f_{lsb}$, are all binary zeros. In particular, the value, v, of the number is $v=(-1)^s\infty$, where "$\infty$" represents the value infinity. On the other hand, if the exponent field bits, $e_{msb} \ldots e_{lsb}$, are all binary ones and the fraction field bits, $f_{msb} \ldots f_{lsb}$, are not all zeros, then the value that is represented is deemed "not a number," abbreviated "NaN."

Further, if the exponent bits, $e_{msb} \ldots e_{lsb}$, are neither all binary ones nor all binary zeros (that is, if the bits represent a binary-encoded value between 1 and 254 in the single format or between 1 and 2046 in the double format), the number is in a "normalized" format and the value of the number is $v=(-1)^s 2^{e-bias}(1.|f_{msb} \ldots f_{lsb})$, where "|" represents a concatenation operation. That is, in the normalized format, a leading bit having the value "one" followed by a binary point and the fraction field bits is implied thereby increasing the size of the fraction field by one bit to twenty four bits in the single format and to fifty three bits in the double format. In effect, the fraction field represents a value greater than or equal to one and less than two.

Still further, if the exponent field bits, $e_{msb} \ldots e_{lsb}$, are all binary zeros and the fraction field bits, $f_{msb} \ldots f_{lsb}$, are not all zero, the number is in a "de-normalized" format and the value of the number is $v=(-1)^s 2^{e-bias+1}(0.|f_{msb} \ldots f_{lsb})$. The range of values that can be expressed in the de-normalized format is disjoint from the range of values that can be expressed in the normalized format, for both the single and double formats.

Finally, if the exponent field bits, $e_{msb} \ldots e_{lsb}$, are all binary zeros and the fraction field bits, $f_{msb} \ldots f_{lsb}$, are all zeros, the value of the number is "zero". The value "zero" may be positive zero or negative zero, depending on the value of the sign bit.

Generally, extended exponent floating point operations are used to evaluate formulae of the form:

$$Q = \frac{(a_1+b_1)*(a_2+b_2)*(a_3+b_3)*\ldots*(a_M+b_M)}{(c_1+d_1)*(c_2+d_2)*(c_3+d_3)*\ldots*(c_N+d_N)} \quad (1)$$

where "M" and "N" are very large and the value of the result, Q, is expected to be a value that can be represented according to IEEE Std. 754, but the numerator and/or denominator may likely overflow or underflow. Such formulae often arise in, for example, evaluation of hypergeometric series (see, for example, W. Press, "Numerical Methods in Fortran", 2d edition, Cambridge University Press, 1992, section 6.12 "Hypergeometric Functions"). Evaluating such formulae generally requires a number of iterations during which individual sums and products and/or quotients involving various groupings of the factors are generated. To accommodate the possibility that the numerator and/or denominator may overflow or underflow, a trap or exception is often taken after each iteration or series of iterations to facilitate adjustment of the exponent so as to avoid an overflow or underflow. After all of the iterations, the exponent of the result is processed to reverse the adjustments that have been made.

While this technique may produce a result that is not an underflow or overflow, the technique is inefficient because of its use of traps or exceptions. Traps can become relatively expensive on modern microprocessors in part because of pipeline stalls and flushes. Further, the technique described above to support extended exponents can be undesirable because low-level traps are not well supported in high-level programming languages. Thus, there is a need for a more efficient way to support floating point operations involving extended exponents.

SUMMARY OF THE INVENTION

There is provided a method for performing an extended exponent floating point operation on a plurality of operands to produce a product of the plurality of operands. The method comprises grouping the plurality of operands into at least one group and determining a plurality of scale factors for the plurality of operands, respectively, and providing a running sum of the plurality of scale factors. The method further comprises scaling the plurality of operands to obtain a plurality of scaled operands and multiplying the plurality of scaled operands to obtain a group product and scaling the group product to obtain a scaled group product. Still further, the method comprises adjusting the scaled group product based on the running sum. The plurality of operands are grouped such that when all the plurality of scaled operands in the at least one group are multiplied an overflow or underflow will not occur.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present exemplary embodiments of the invention, examples of which are illustrated in the accompanying drawings. Wherever possible, the same reference numbers will be used throughout the drawings to refer to the same or like parts.

Figure 1:
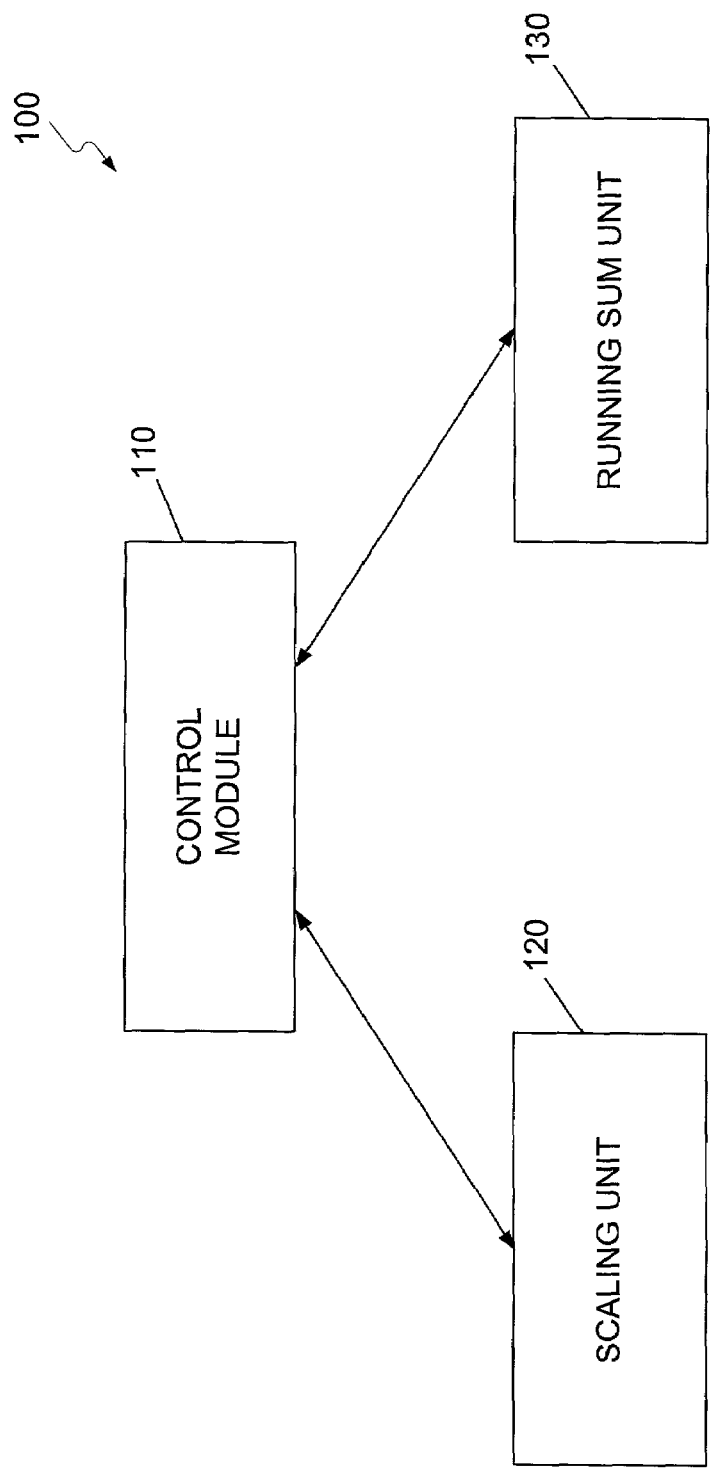
FIG. 1 illustrates a functional block diagram of an exemplary extended exponent floating point unit according to an embodiment of the present invention.

FIG. 1 depicts a functional block diagram of an exemplary extended exponent floating point unit 100 that may be used to compute a result, Q, of a formula in the form of:

$$Q = \frac{(A_1)*(A_2)*(A_3)*...*(A_M)}{(B_1)*(B_2)*(B_3)*...*(B_N)} \qquad (2)$$

As illustrated in FIG. 1, the extended exponent floating point unit 100 may include a control module 110, a scaling unit 120, and a running sum unit 130.

In general, the scaling unit 120 may receive two operands, A and B, scale operand B, and multiply operand A by the scaled operand B. That is, operand A remains unscaled while operand B is scaled before operand A is multiplied by operand B. In one embodiment, scaling unit 120 may scale operand B by multiplying it by a power of two that is selected so that the magnitude of operand B is greater than or equal to one and less than two, unless operand B is in a zero format, underflow format, overflow format, infinity format, or NaN format. The scaling unit 120 may perform the scaling by adjusting an exponent field of operand B. If the operand B is in the zero format, underflow format, overflow format, infinity format, or NaN format, the operand B may not be scaled. If the operand B is in the denormalized format, it may be transformed to the normalized format. After scaling unit 120 processes operand B, it multiplies operand A by the scaled operand B.

When carrying out a floating point operation involving extended precision exponents, the control module 110 multiplies the product of the factors of the numerator, $(A_1)*$ $(A_2)*(A_3)* \ldots * (A_M)$, without causing an underflow or overflow, by grouping the factors into a number of groups and then using scaling unit 120 to scale and multiply the factor in each group. The control module 110 groups the factors of the numerator so that an overflow may not occur when the scaled factors of a group are multiplied together. Accordingly, the control module 110 may group the factors into $M/M_1$ groups wherein each group may comprise $M_1$ factors or less. If a factor, $A_n$, is the sum of two floating point values (e.g., $a_n+b_n$), the sum is generated prior to being processed by scaling unit 120. The sum may be generated using an adder unit according to U.S. patent application Ser. No. 10/035,595, filed on even date herewith in the name of Guy L. Steele Jr. and entitled "Floating Point Adder With Embedded Status Information," assigned to the assignee of the present application, for example.

Scaling unit 120 multiplies the factors in a first group in a number of iterations corresponding to the number of factors in the group. During the first iteration, operand A of scaling unit 120 equals one and a first factor of the first group is input as operand B. Scaling unit 120 scales the first factor of the group and then multiplies the scaled first factor by one. For each subsequent iteration, the result of the previous iteration is input as operand A and the next factor to be scaled is input as operand B. These iterations continue until the last factor in the first group is scaled and multiplied by the result of the previous iteration. Because each scaled factor has a value greater than or equal to one and less than two, the product of $M_1$ scaled factors will be greater than or equal to one and less than $2^{M_1}$.

After all the factors in the first group are multiplied together resulting in a group product, the control module 110 enables the scaling unit 120 to scale the group product by providing the group product as operand B and a value of one as operand A.

For each subsequent group of factors processed, the procedure described for the first group is repeated, except that for the first iteration the scaled group product of the previous group is input as operand A. After all the groups are processed, resulting in a final product equal the scaled product of all the factors of the numerator, the control module 110 may enable scaling unit 120 to scale the final product resulting in a scaled final product, $PRODUCT_{NUM}$. The scaled final product of the denominator, $PRODUCT_{DEN}$, may be computed in a similar manner. Exemplary embodiments of the scaling unit 120 will be described below in connection with FIGS. 3–7.

Since a thirty-two bit floating point representation can represent numbers of up to $2^{127}$, scaling unit 120 may multiply 127 factors without risking the result overflowing. Accordingly, the control module 110 may enable factors to be processed in groups of 127.

The running sum unit 130 receives two operands, J and F. Operand J may be in an integer format and an operand F may be in a floating point format. Running sum unit 130 determines an integer, K, such that the value, $F*2^{-K}$, is greater than or equal to one and less than two. The running sum unit 130 provides a result equal to the sum of the operand, J, and the integer, K, unless the floating point operand, F, is in a zero format, underflow format, overflow format, infinity format, or NaN format. If the floating point operand, F, is in the zero format, underflow format, overflow format, infinity format, or NaN format, running sum unit 130 may provide the operand, J, as a result.

As discussed above, the product of the factors of the numerator, $(A_1)*(A_2)*(A_3)* \ldots * (A_M)$, is computed by scaling each factor in a group by a corresponding scale factor. Control module 110 uses running sum unit 130 to compute a running sum of the scale factors. If the floating point operand, F, corresponds to the operand to be scaled by the scaling unit 120, the integer K, represents the amount by which the operand is scaled by scaling unit 120. Accordingly, as scaling unit 120, through a series of iterations, scales the factors in a group, running sum unit 130 may generate a running sum that corresponds to the sum of the scale factors used by scaling unit 120 as follows. During the first iteration of the first group of factors of the numerator, operand J of running sum unit 130 equals zero and a first factor of the group is input as operand F. Running sum unit 12 determines an integer, K, such that the value, $F*2^{-K}$, is greater than or equal to one and less than two and adds the integer K to operand J. For each subsequent iteration, the result of the previous iteration is input as operand J and the next factor of the group is input as operand F. These iterations continue until the last factor in the group is processed.

Recall that after all the factors in the first group are multiplied together by scaling unit 120 resulting in a group product, the control module 110 enables scaling unit 120 to scale the group product. Similarly, after all the factor in the first group are processed by running sum unit 130 resulting in a group running sum, the control module 110 enables running sum unit 130 to update the group running sum by the scale factor for the group product. For each subsequent group or factors processed, the procedure described for the first group is repeated, except that for the first iteration the group running sum of the previous group is input as operand J. Still further, recall that after all the groups are processed by scaling unit 120 resulting in a final product, the control module 110 may enable scaling unit 120 to scale the final product. Similarly, after all the groups are processed by running sum unit 130 resulting in a final running sum of the scale factors of all the factors of the numerator, the control module 110 may enable running sum unit 130 to update the final running sum by the scale factor for the final product resulting in a final scale factor, $SF_{NUM}$. A final scale factor for the denominator, $SF_{DEN}$, may be computed in a similar manner. Exemplary embodiments of the running sum unit 130 will be described below in connection with FIGS. 8–12.

The result of equation (2) may be computed by dividing the final product of the numerator, $PRODUCT_{NUM}$, by the final product of the denominator, $PRODUCT_{DEN}$, to obtain a scaled quotient, which value will be in a floating point representation. The scaled quotient may be generated using a divider unit according to U.S. patent application Ser. No. 10/035,647, filed on even date herewith in the name of Guy L. Steele Jr. and entitled "Floating Point Divider With Embedded Status Information," assigned to the assignee of the present application, for example. The value of $PRODUCT_{NUM}/PRODUCT_{DEN}$ may be greater than one-half and less than two. The final scale factor of the denominator, $SF_{DEN}$, is subtracted from the final scale factor of the numerator, $SF_{NUM}$, to obtain a quotient scale factor, which may be in an integer representation. The final result, Q, may be generated by adjusting the value of the exponent of the scaled quotient by an amount relating to the quotient scale factor, as specified by the SCALB function in the appendix to IEEE Std. 754. Specifically, the final result Q may correspond to $SCALB(PRODUCT_{NUM}/PRODUCT_{DEN}, SF_{NUM}-SF_{DEN})$. This is notably accomplished without having to resort to traps to catch overflow and underflow situations.

In an exemplary embodiment, the extended exponent floating point unit 100 may process floating point operations involving extended exponents in a manner corresponding to the following computer code:

```
[051]   CodeSegment1
[052]   PRODUCT = 1.0
[053]   SF = 0
[054]   ICOUNT = 0
[055]   DO i = 1,N
[056]     SF = RSU(SF, A(i))
[057]     PRODUCT = SU(PRODUCT, A(i))
[058]     ICOUNT = ICOUNT + 1
[059]     IF(ICOUNT .EQ. 126)
[060]       SF = RSU(SF, PRODUCT)
[061]       PRODUCT = SU(1.0, PRODUCT)
[062]       ICOUNT = 0
[063]     END IF
[064]   END DO
[065]   SF = RSU(SF, PRODUCT)
[066]   PRODUCT = SU(1.0, PRODUCT)
```

In exemplary Code Segment 1, lines at paragraphs [052] through [054] are used to initialize values for PRODUCT, SF, and ICOUNT. ICOUNT is used as an iteration counter to keep track of the number of iterations so that the factors are processed in groups of 126. "SU" represents a function that operates according to scaling unit 120, having a first argument corresponding to the operand that is not scaled and a second argument corresponding to the operand that may be scaled. "RSU" represents a function that operates according to running sum unit 130, having a first argument corresponding to operand J and a second argument corresponding to the operand, F. Lines at paragraphs [055] through [064] in Code Segment 1 represent processing operations that may be performed by scaling unit 120 and running sum unit 130 under control of the control module 110, through successive iterations. In each "i-th" iteration, control module 110 updates the value for SF by executing RSU with the first argument corresponding to the value of SF generated during the previous "i-1st" iteration and the second argument corresponding to the "i-th" factor A(i) (i=1, . . . , N), where the first argument equals zero during the first iteration. In addition, control module 110 updates the value of PRODUCT by executing SU with the first argument corresponding to the value for PRODUCT generated during the previous "i-1st" iteration and the second argument corresponding to the "i-th" factor A(i), where the first argument equals one during the first iteration. The iteration counter, ICOUNT, is also incremented at paragraph [058] and if the value of ICOUNT equals 126, lines at paragraphs [060] through [062] are executed to scale the value of PRODUCT and SF accordingly and to reset ICOUNT. Operations described above in connection with lines at paragraphs [056] through [063] may be performed for each of the "N" factors A(i) (I=1, . . . ,N) in the numerator or denominator of equation (1). After all of the factors have been processed, scaling unit 120 scales the value of PRODUCT (line at paragraph [066]) generated during the last iteration and running sum unit 130 updates the value of SF (line at paragraph [065]) to reflect the scaling.

The extended exponent floating point unit 100 may make use of other methodologies to generate values for PRODUCT and SF. For example, instead of making use of an iteration counter, ICOUNT, the extended exponent floating point unit 100 may make use of a constant having a value $2^{126}$, for example, and compare the value of PRODUCT generated during each iteration to the constant. In each iteration, running sum unit 130 and scaling unit 120 execute lines at paragraphs [056] through [057], respectively, to generate preliminary values for SF and PRODUCT. Thereafter, the preliminary value of PRODUCT may be compared to the constant $2^{126}$. If the preliminary value is greater than $2^{126}$, lines at paragraphs [060] through [061] may be executed to scale the preliminary value of PRODUCT and adjust the value of SF accordingly, with the scaled and adjusted values being used as the final PRODUCT and SF values for the respective iteration. Since the constant $2^{126}$ may be used to determine whether to scale the preliminary PRODUCT and SF values, it may not be necessary to perform a reset operation (paragraph [062]). Other methodologies will be apparent to those of ordinary skill in the art.

Figure 2:
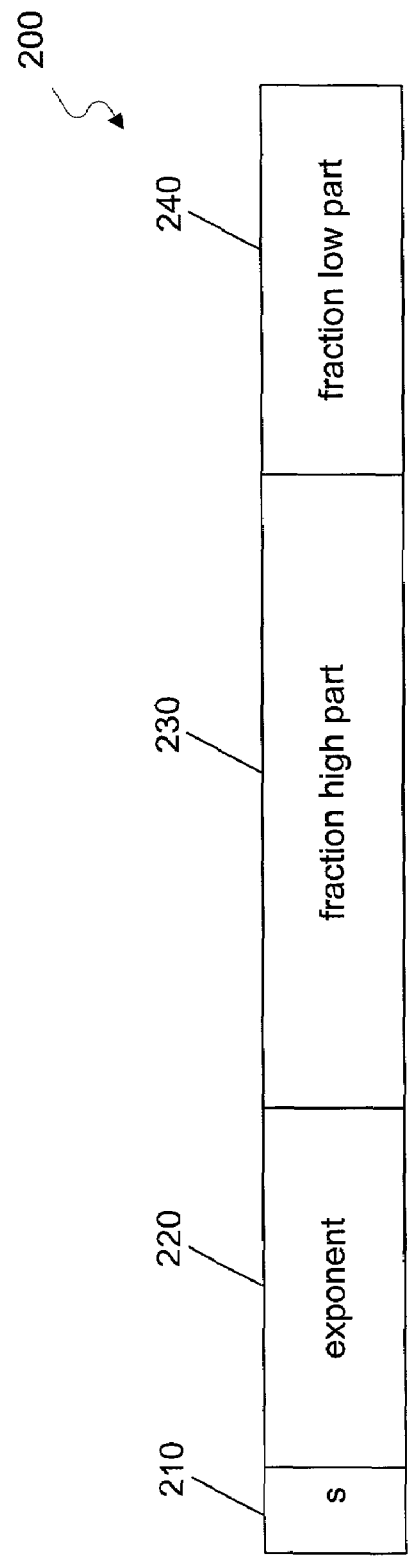
FIG. 2 illustrates an exemplary floating point operand used in an embodiment of the invention.

An operand of the extended exponent floating point unit 100 may include floating point status information. Because the floating point status information is included in the operand, instead of being separate from the operand as in prior art extended exponent floating point units, the implicit serialization that may be required in prior art extended exponent floating point units may be obviated. As shown in FIG. 2, an exemplary floating point operand 200 may include a sign bit 210, an exponent field 220 having eight exponent field bits, $e_{msb} \ldots e_{lsb}$, and a fraction field having a high part 230 and a low part 240 that together includes twenty-three fraction field bits, $f_{msb} \ldots f_{lsb}$. To preserve status information that may be stored in the operand 200, the extended exponent floating point unit 100 may divide the fraction field into two parts, the high part 230 and the low part 240. The fraction field low part 240 may contain all the fraction field bits that store status information. The fraction field high part 230 may contain all other bits of the fraction field. The fraction field high part 230 may consist of the eighteen most significant bits, $f_{msb} \ldots f_{lsb+5}$, of the operand fraction field. The fraction field low part 240, which contain the status information, may consist of the remaining five least significant bits, $f_{lsb+4} \ldots f_{lsb}$, of the operand fraction field. In alternate embodiments, the bits of the operand 200 may be distributed among the various fields in a variety of different combinations. For example, the exponent field 220 may consist of eight bits, the fraction field high part 230 may consist of the twenty most significant bits, $f_{msb} \ldots f_{lsb+3}$, of the operand, and the fraction field low part 240 may consist of the remaining three least significant bits, $f_{lsb+2} \ldots f_{lsb}$, of the operand fraction field. Still further, the status information may be stored in disjointed bits of the fraction field and therefore the fraction field high part 230 and the fraction field low part 240 may not be continuous segments of the fraction field as illustrated in FIG. 2.

Figure 13:
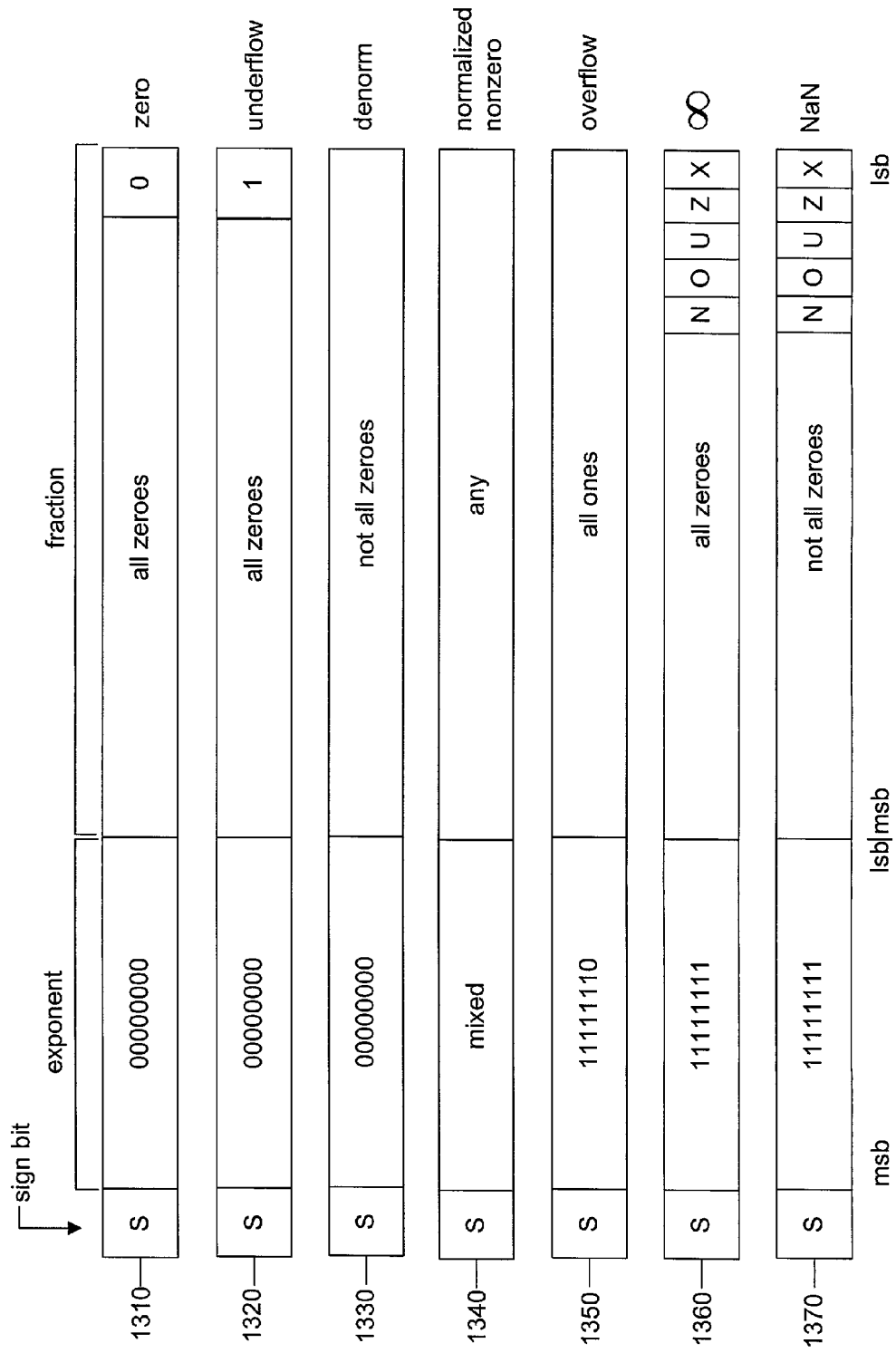
FIG. 13 illustrates exemplary formats for representing a floating point operand according to an embodiment of the present invention.

The extended exponent floating point unit 100 may receive operands or generate results having formats according to U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application. FIG. 13 depicts seven exemplary formats as disclosed U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, including a zero format 1310, an underflow format 1320, a denormalized format 1330, a normalized non-zero format 1340, an overflow format 1350, an infinity format 1360, and a not-a-number (NaN) format 1370.

As shown in FIG. 13, in the zero format 1310, the exponent field bits, $e_{msb} \ldots e_{lsb}$, and the fraction field bits, $f_{msb} \ldots f_{lsb}$, are all binary zeros. The underflow format 1320 indicates that the operand or result is an underflow. In the underflow format 1320, the sign bit, s, indicates whether the result is positive or negative, the exponent field bits, $e_{msb}$ ... $e_{lsb}$, are all binary zeros, and the fraction field bits $f_{msb}$ ... $f_{lsb+1}$ are all binary zeros. The least significant bit of the fraction field, $f_{lsb}$, is a binary one.

The denormalized format 1330 and normalized non-zero format 1340 are used to represent finite non-zero floating point values substantially along the lines of that described above in connection with IEEE Std. 754. In both formats 1330 and 1340, the sign bit, s, indicates whether the result is positive or negative. The exponent field bits, $e_{msb}$ ... $e_{lsb}$, of the denormalized format 1330 are all binary zeros, whereas the exponent field bits, $e_{msb}$ ... $e_{lsb}$, of the normalized non-zero format 103 are mixed ones and zeros. However, the exponent field of the normalized non-zero format 1340 will not have a pattern where exponent field bits $e_{msb}$ ... $e_{lsb+1}$ are all binary ones, the least significant exponent field bit, $e_{lsb}$, is zero, and the fraction field bits, $f_{msb}$ ... $f_{lsb}$, are all binary ones. In format 1330, the fraction field bits, $f_{msb}$ ... $f_{lsb}$, are not all binary zeros.

The overflow format 1350 indicates that the operand or result is an overflow. In the overflow format 1350, the sign bit, s, indicates whether the result is positive or negative, the exponent field bits $e_{msb}$ ... $e_{lsb+1}$ are all binary ones, the least significant exponent field bit, $e_{lsb}$, is a binary zero, and the fraction field bits, $f_{msb}$ ... $f_{lsb}$, are all binary ones.

The infinity format 1360 indicates that the operand or result is infinite. In the infinity format 1360, the sign bit, s, indicates whether the result is positive or negative, the exponent field bits, $e_{msb}$ ... $e_{lsb}$, are all binary ones, and the fraction field bits $f_{msb}$ ... $f_{lsb+5}$ are all binary zeros. The five least significant fraction field bits, $f_{lsb+4}$ ... $f_{lsb}$, are flags, which will be described below.

The NaN format 1370 indicates that the operand or result is not a number. In the NaN format 1370, the sign bit, s, indicates whether the result is positive or negative, the exponent field bits, $e_{msb}$ ... $e_{lsb}$, are all binary ones, and the fraction field bits $f_{msb}$ ... $f_{lsb+5}$ are not all binary zeros. The five least significant fraction field bits, $f_{lsb+4}$ ... $f_{lsb}$, are flags, which will be described below.

For the infinity format 1360 and the NaN format 1370, the five flags of the five least significant fraction field bits, $f_{lsb+4}$ ... $f_{lsb}$, include the IEEE Std. 754 flags. These flags include an invalid operation flag, n, an overflow flag, o, an underflow flag, u, a division-by-zero flag, z, and an inexact flag, x. For example, a number in the NaN format 36 with the overflow flag, o, and the division-by-zero flag, z, set, indicates that the number resulted from computation in which an overflow occurred and a divide by zero was attempted. The flags provide the same status information as would be provided by a floating point status register in a prior art floating point unit. By storing status information as part of the result and storing the result in registers, multiple instructions may be executed contemporaneously because floating point status information that may be generated during execution of one instruction, when stored, will not over-write previously-stored floating point status information generated during execution of another instruction.

In addition, in one embodiment, a value in the other formats may be indicated as being inexact according to U.S. patent application Ser. No. 10/035,589, filed on even date herewith in the name of Guy L. Steele Jr. and entitled "Floating-Point Computation with Detection and Representation of Inexact Computations Without Flags or Traps."

Figure 3:
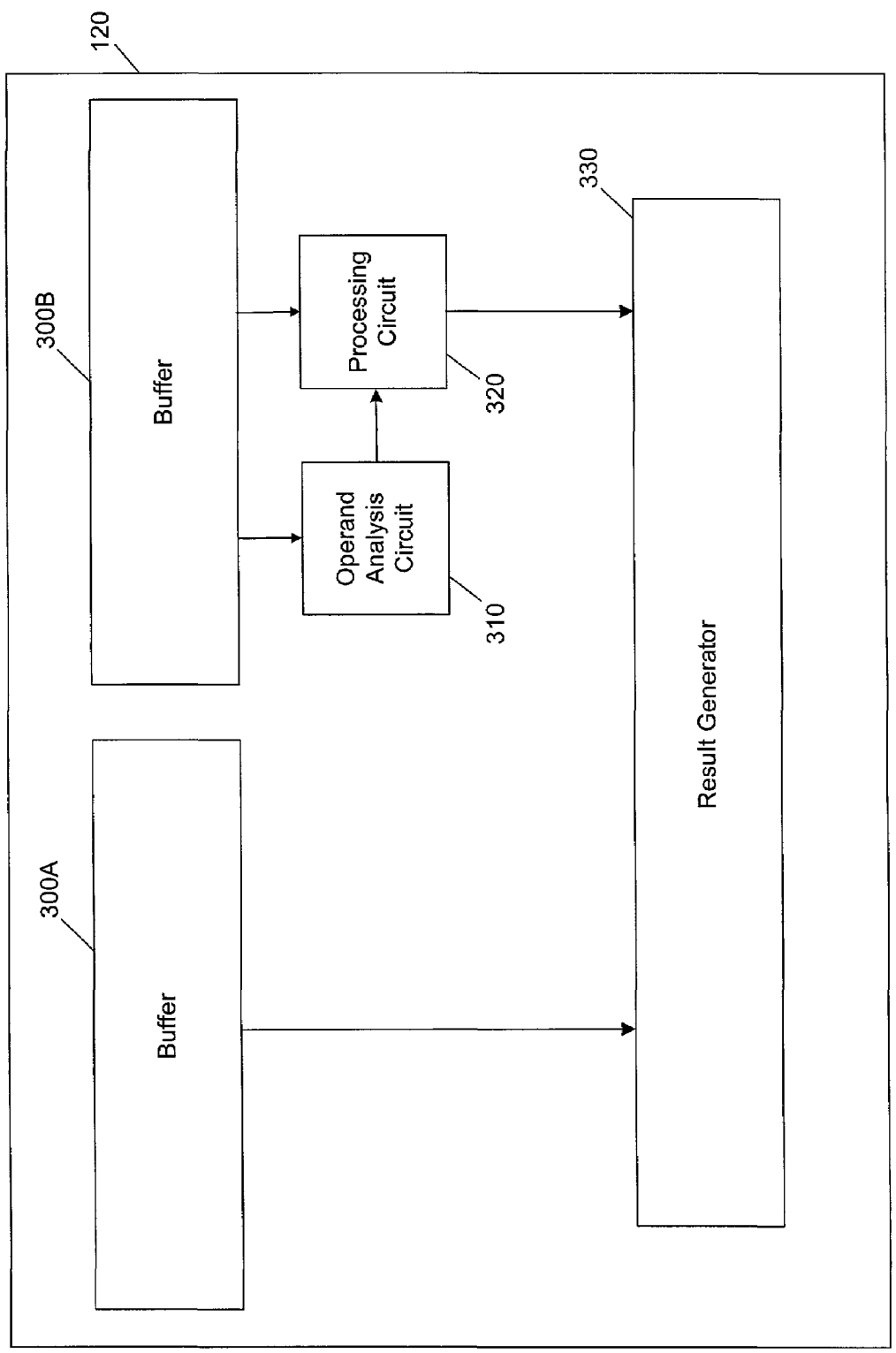
FIG. 3 illustrates a general block diagram of an exemplary scaling unit according to an embodiment of the present invention.

FIG. 3 illustrates an exemplary embodiment of the scaling unit 120. In general, the scaling unit 120 may comprise operand buffers 300A and 300B, an operand analysis circuit 310, a processing circuit 320, and a result generator 330. The operand buffer 300A may receive a floating point operand, which corresponds to operand A discussed above. The operand buffer 300B may receive a floating point operand, which corresponds to operand B discussed above. The floating point operand 300A, 300B may be in a floating point format according to U.S. patent application Ser. No. 10/035, 747, filed on even date herewith in the name of Guy L. Steele Jr. and entitled "Floating Point System That Represents Status Flag Information Within A Floating Point Operand," assigned to the assignee of the present application, U.S. Pat. No. 6,131,106, or IEEE Std. 754.

The operand analysis circuit 310 analyzes the operand in the operand buffer 300B and generates signals indicating the format of the operand, which signals are provided to the processing circuit 320.

The processing circuit 320 receives the signals from the operand analysis circuit 310 and signals representing the exponent field and fraction field of the floating point operand in operand buffer 300B. If the signals from the operand analysis circuit 310 indicate that the operand in operand buffer 300B is in the denormalized format 1330 or normalized non-zero format 1340, processing circuit 320 generates signals representing the operand in operand buffer 300B scaled to a value greater than or equal to one and less than two. If the signals from the operand analysis circuit 310 indicate that the operand in operand buffer 300B is in a delimited format, processing circuit 320 generates signals representing the operand in operand buffer 300B with the delimiter flag clear. If the signals from the operand analysis circuit 310 indicate that the operand in operand buffer 300B is any other format, processing circuit 320 generates signals representing the operand in operand buffer 300B. The signals from the processing circuit 320 are provided to the result generator 330.

The result generator 330 receives signals representative of the operand in operand buffer 300A and signals from the processing circuit 320 representative of the operand in operand buffer 300B, which may have been scaled. The result generator 330 generates signals representative of the result of operand in operand buffer 300A multiplied by the scaled operand in operand buffer 300B. The result is coupled onto a result bus 75 for use by the control module.

If status information is embedded in at least one of the operands in operand buffer 300A or 330B, the scaling unit 120 operates to preserve the stored status information.

Figure 4:
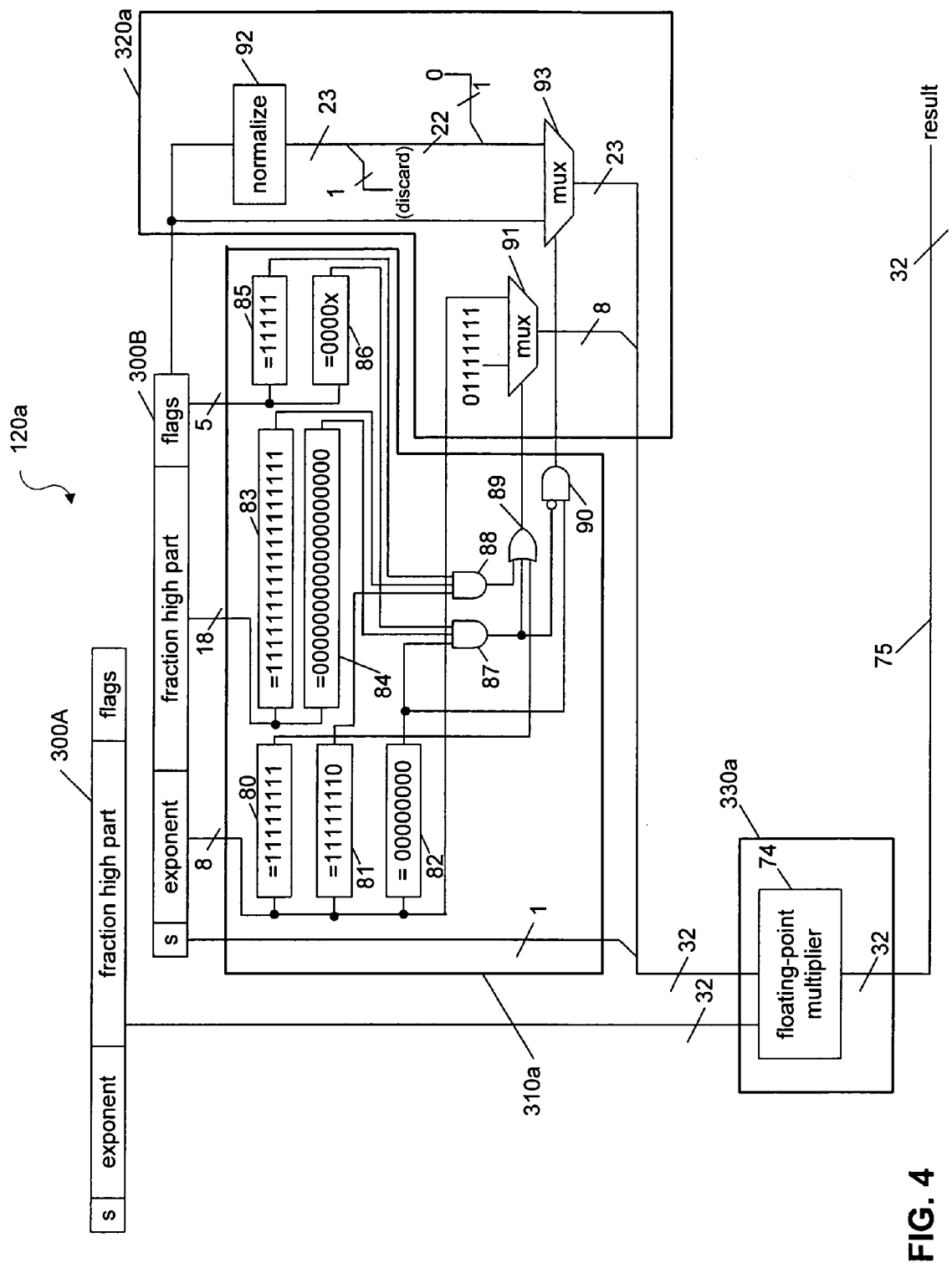
FIG. 4 illustrates a functional block diagram of a first exemplary scaling unit according to an embodiment of the present invention.

FIG. 4 illustrates an exemplary embodiment of a scaling unit 120a that may be used when the floating point operand stored in the operand buffer 300B may be in a format according to U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application. The scaling unit 120a may comprise operand buffers 300A and 300B an operand analysis circuit 310a, a processing circuit 320a, and a result generator 330a.

Generally, the operand analysis circuit 310a may determine the format of the operand in operand buffer 300B using comparators 80–86 and logic elements 87–90. For each comparator 80–86, the comparator generates an asserted signal if the bit pattern of the input to the comparator matches the bit pattern indicated. An 'x' in the bit pattern represents a "don't care." Comparators 80–82 receive the exponent field bits, $e_{msb}$ ... $e_{lsb}$, of the operand stored in operand buffer 300B. Comparators 83, 84 receive the fraction field high part bits, $f_{msb} \ldots f_{lsb+1}$ of the operand stored in operand buffer 300B. Comparators 85, 86 receive the fraction field low part bits, $f_{lsb+4} \ldots f_{lsb}$, of the operand stored in operand buffer 300B.

Accordingly, comparator 80 generates an asserted signal if the operand is in the infinity format 1360 or the NaN format 1370. Comparator 81 generates an asserted signal if the operand is in the overflow format 1350. Comparator 82 generates an asserted signal if the operand is in the zero format 1310, underflow format 1320, or denormalized format 1330. Comparator 83 may generate an asserted signal if the operand is in the denormalized format 1330, normalized non-zero format 1340, overflow format 1350, or NaN format 1370. Comparator 84 may generate an asserted signal if the operand is in the zero format 1310, underflow format 1320, denormalized format 1330, normalized non-zero format 1340, or infinity format 1360. Comparator 85 may generate an asserted signal if the operand is in the denormalized format 1330 or normalized non-zero format 1340 and will generate an asserted signal if the operand is in the overflow format 1350 or if the operand is in the infinity format 1360 or NaN format 1370 with the flags, n, o, u, z, and x, all set. Comparator 86 generates an asserted signal if the operand is in the zero format 1310 or underflow format 1320 and may generate an asserted signal if the operand is in the denormalized format 1330, normalized non-zero format 1340, overflow format 1350, or infinity format 1360 or NaN format 1370 with the flags n, o, u, and z all clear and the flag x either set or clear.

The logic elements 87–90 receive signals from the comparators 80–86 and generate signals to indicate the format of the operand in operand buffer 300B. If the operand is in the zero format 1310 or the underflow format 1320, the AND gate 87 generates an asserted signal. Further, the AND gate 88 generates an asserted signal if the operand is in the overflow format 1350. Still further, the OR gate 89 generates an asserted signal if the operand is in the zero format 1310, underflow format 1320; overflow format 1350, infinity format 1360, or NaN format 1370. The gate 90 generates an asserted signal if the operand is in the denormalized format 1330.

The processing circuit 320a may comprise a multiplexer 91, a normalizer circuit 92, and a multiplexer 93. The multiplexer 91 provides signals representing the exponent field bits of the scaled operand in operand buffer 300B to the result generator 330a, based on the format of the operand in operand buffer 300B. If signals from the operand analysis circuit 310a indicate that the operand is in the zero format 1310, underflow format 1320; overflow format 1350, infinity format 1360, or NaN format 1370 (i.e., if the OR gate 89 generates an asserted signal), the multiplexer 91 may couple signals representative of the exponent field bits, $e_{msb} \ldots e_{lsb}$, of the operand in the operand buffer 300B to the result generator 330a. If signals from the operand analysis circuit 310a indicates that the operand is in the denormalized format 1330 or the normalized non-zero format 1340 (i.e., if the OR gate 89 generates a low signal), the multiplexer 91 may couple to the result generator 330a signals representing a bias value according to IEEE Std. 754, for example, which corresponds to an exponent having the value zero. The bias value according to IEEE Std. 754 has a bit pattern of 01111111.

The normalizer circuit 92 receives signals representing the fraction field bits, $f_{msb} \ldots f_{lsb}$, of the operand in operand buffer 300B and generates a normalized fraction. The normalizer circuit 92 shifts the fraction field bits, $f_{msb} \ldots f_{lsb}$, of the operand to the left by a number of bit positions corresponding to the number of leading zeros, so that the most significant bit is a one. The normalizer circuit 92 also shifts a corresponding number of zeros into the least significant bit positions. If the operand in operand buffer 300B is in the denormalized format 1330, the normalizer circuit 92 will operate to normalize the value represented by the fraction field of the operand. Following normalization by the normalizer circuit 92, the most significant bit may be discarded, which has a value of one, thereby producing signals representing an "implicit" normalized value. A bit having the value zero may also be provided in the least significant bit position. Thus, a normalized value may be generated in which the most significant bit is implicit having the value one, as specified by IEEE Std. 754.

The multiplexer 93 provides signals representing the fraction field bits of the scaled operand in operand buffer 300B to the result generator 330a, based on the format of the operand in operand buffer 300B. If signals from the operand analysis circuit 310a indicate that the operand is in the zero format 1310, underflow format 1320, normalized non-zero format 1340, overflow format 1350, infinity format 1360, or NaN format 1370 (i.e., if the gate 90 generates a low signal), the multiplexer 93 may couple signals representative of the fraction field bits of the operand in the operand buffer 300B to the result generator 330a. Thus, if status information is stored in the operand, scaling unit 120a will preserve the status information. If signals from the operand analysis circuit 310a indicate that the operand is in the denormalized format 1330 (i.e., if the gate 90 generates an asserted signal), the multiplexer 93 may couple signals from the normalizer circuit 92 to the result generator 330a.

The result generator 330a may be in the form of a floating point multiplier unit 74 as disclosed in U.S. patent application Ser. No. 10/035,580, filed on even date herewith in the name of Guy L. Steele Jr. and entitled "Floating Point Multiplier With Embedded Status Information," assigned to the assignee of the present application. The result is coupled to result bus 75.

Figure 5:
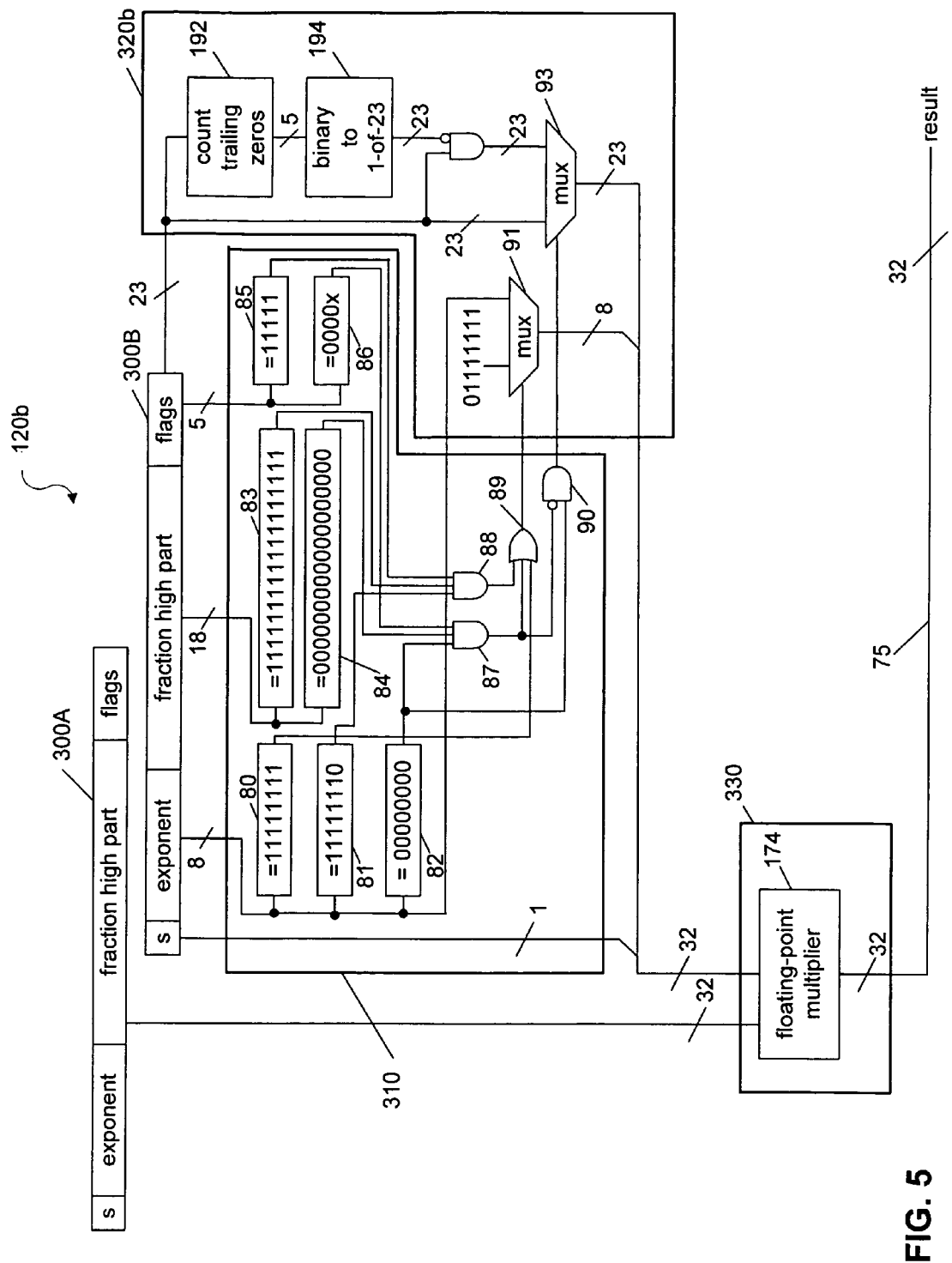
FIG. 5 illustrates a functional block diagram of a second exemplary scaling unit according to an embodiment of the present invention.

FIG. 5 illustrates an exemplary embodiment of a scaling unit 120b that may be used when the floating point operand stored in the operand buffer 300B may be in a format according to U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, but, instead of the denormalized format 1330, the operand may be in a delimited format according to U.S. Pat. No. 6,131,106.

The '106 patent describes a system for performing floating point computations on operands in a delimited format in the place of operands in a denormalized format. For an operand in the delimited format, all the exponent field bits equal a binary zero. The bits in the fraction field correspond to the bits in the fraction field in the de-normalized format shifted to the left by n bits, where n equals the number of leading zeros in the fraction field of the de-normalized format plus one. Thus, the delimited format provides an implicit most significant digit with the value one in the fraction field. A delimiter flag is also provided in the fraction field of the operand in the delimited format at a bit position to the right of the bit position that corresponds to the least significant fraction field bit of the operand in the de-normalized format. The delimiter flag indicates the series of fraction field bits of the delimited format that correspond to the series of bits immediately to the right of the most significant fraction field bit of the de-normalized format. In that case, the number, n, of successive fraction field bits, $f_{msb} \ldots f_{lsb}$, from the high-order bit, $f_{msb}$, to the first bit $f_{msb-n}$ that has the value one in the denormalized format will correspond to the number, n, of bits $f_{lsb+n} \ldots f_{lsb}$ of the delimited representation following the delimiter flag, which corresponds to the least significant bit that has the value one. Except for the delimiter flag, the fraction field of an operand in the delimited format will be normalized, and the number of trailing zeroes, that is the number, n, of bits in bit positions $f_{lsb+n} \ldots f_{lsb}$ following the delimiter flag, will correspond to the scale factor for the operand.

The scaling unit 120b is identical to the scaling unit 120a described above, except that scaling unit 120b includes a count trailing zeros circuit 192, a "binary to 1-of-23" circuit 194, and twenty-three gates 195, instead of a normalizer 92. Since, except for the delimiter flag, the fraction field of an operand in the delimited format is normalized, the scaling unit 120b may clear only the delimiter flag. Therefore, instead of a normalizer 92, the scaling unit 120b includes the count trailing zeros circuit 192, the "binary to 1-of-23" circuit 194, and the twenty three gates 195 to clear the delimiter flag. The count trailing zeros circuit 192 generates output signals representing the number n, where n equals the number of bits equal to zero to the right of the delimiter flag. The "binary to 1-of-23" circuit 194 generates twenty three bits equal to zero, except the bit in the bit position n+1 from the right, corresponding the bit position of the delimiter flag in the fraction field bits of the operand in operand buffer 300B. The twenty three gates 195 operate to pass all the fraction field bits of the operand to the multiplexer 93, except the delimiter flag, which is set equal to zero. Otherwise, the scaling unit 120b operates in the same manner scaling unit 120a and includes floating-point multiplier 174.

Figure 6:
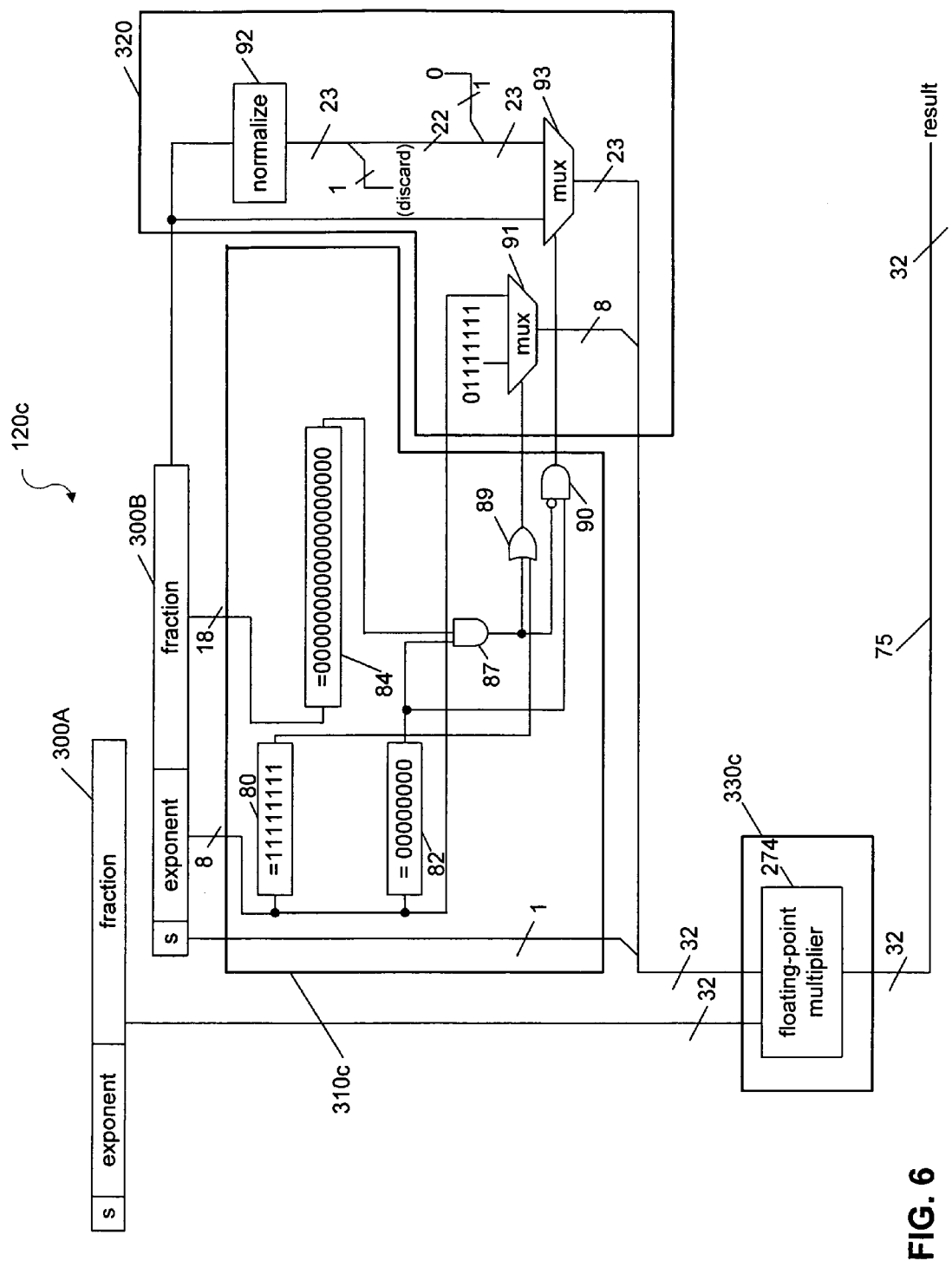
FIG. 6 illustrates a functional block diagram of a third exemplary scaling unit according to an embodiment of the present invention.
Figure 7:
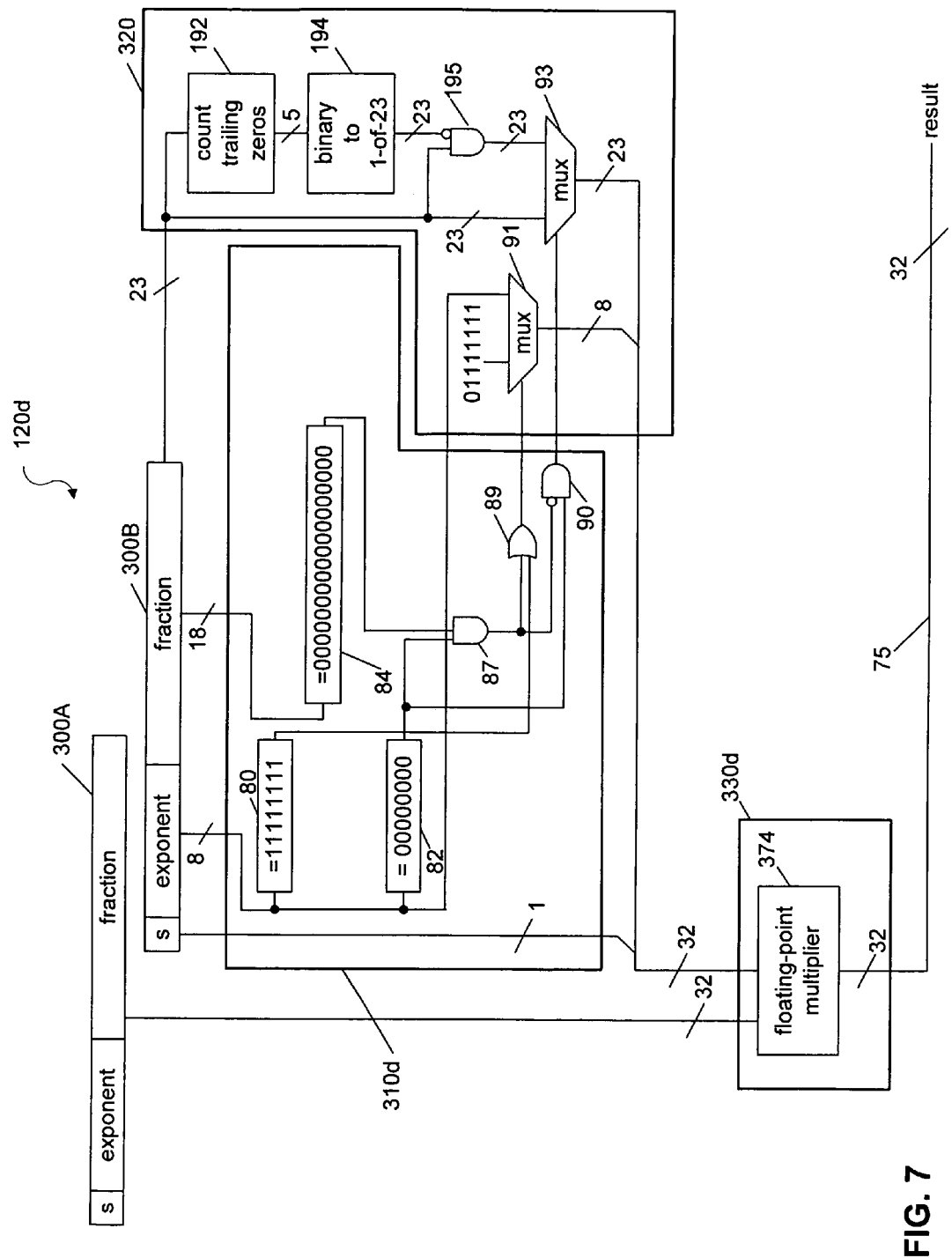
FIG. 7 illustrates a functional block diagram of a fourth exemplary scaling unit according to an embodiment of the present invention.

FIG. 6 illustrates an exemplary embodiment of a scaling unit 120c that may be used when the floating point operand stored in the operand buffer 300B may be in a format according to IEEE Std. 754. FIG. 7 illustrates an exemplary embodiment of a scaling unit 120d that may be used when the floating point operand stored in the operand buffer 300B may be in a format according to IEEE Std. 754, but, instead of the denormalized format, the operand may be in a delimited format according to U.S. Pat. No. 6,131,106.

The scaling units 130c and 130d are generally similar to scaling units 130a and 130b, respectively, except that comparators 81, 83, 85, and 86 and logic element 88 have been removed in the operand analysis circuits 310c and 310d because there is no underflow 1320 and overflow 1350 format in IEEE Std. 754 and no status flag information stored in the operand in IEEE Std. 754. Further, because no status flag information is stored in the operand in IEEE Std. 754, the result generator 330c including floating-point multiplier 274 may correspond to a multiplier unit for performing conventional multiplication operations in accordance with IEEE Std. 754. The result generator 330d including floating point multiplier 374 may correspond to a multiplier unit as disclosed in U.S. Pat. No. 6,131,106.

Figure 8:
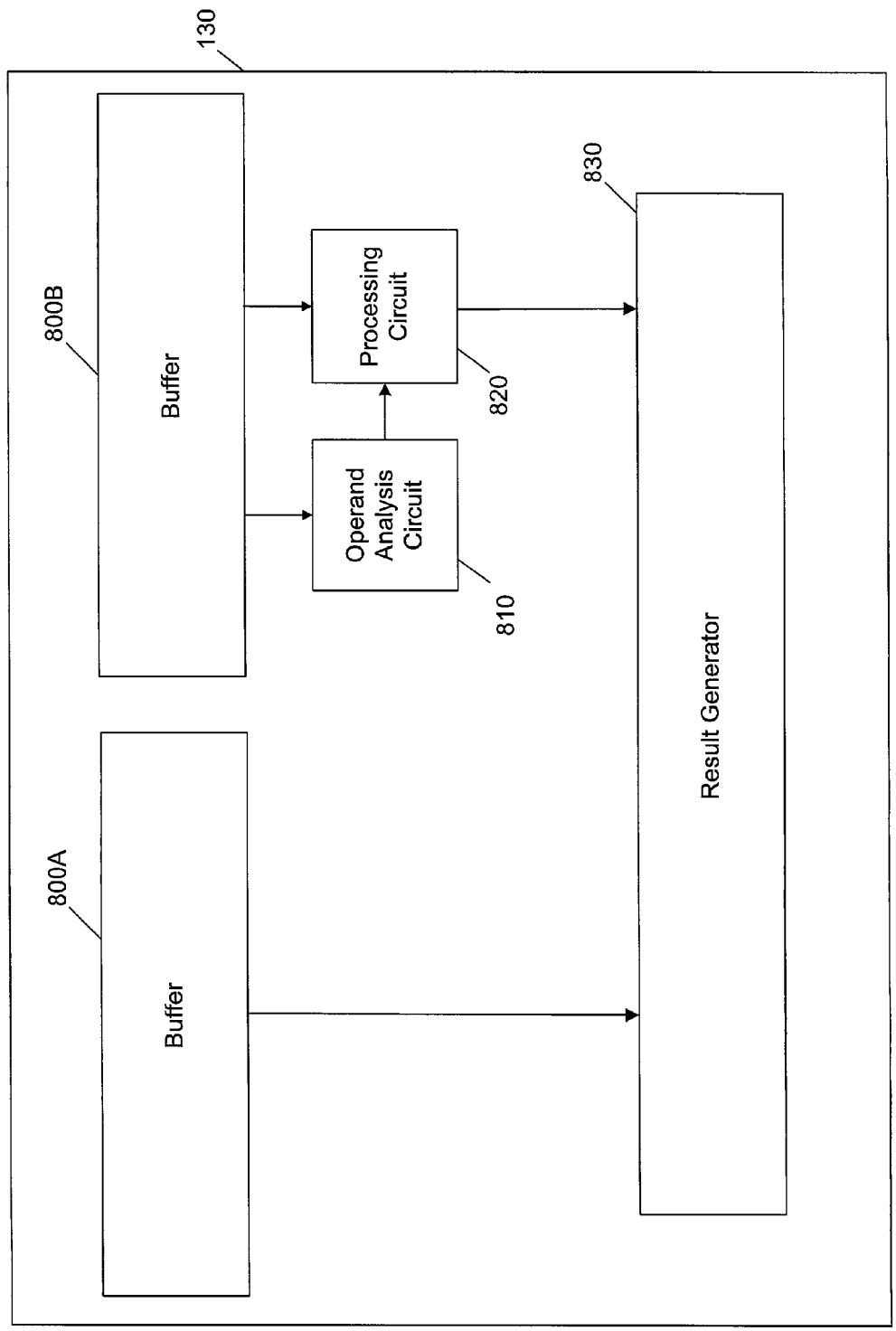
FIG. 8 illustrates a general block diagram of an exemplary running sum unit according to an embodiment of the present invention.

Turning to FIG. 8, exemplary running sum unit 130 may comprise operand buffers 800A, 800B, an operand analysis circuit 810, a processing circuit 820, and a result generator 830. The operand buffer 800A may receive an integer operand, which corresponds to operand J discussed above. The operand buffer 800B may receive a floating point operand, which corresponds to operand F discussed above. The floating point operand may be in a floating point format according to U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, U.S. Pat. No. 6,131,106, or IEEE Std. 754.

The operand analysis circuit 810 analyzes the operand in the operand buffer 800B and generates signals indicating the format of the operand, which signals are provided to the processing circuit 820.

The processing circuit 820 receives the signals from the operand analysis circuit 810 and signals representing the exponent field and fraction field of the operand in operand buffer 800B and generates signals representing a scale factor corresponding to integer K discussed above. That is, processing circuit 820 determines an integer, K, such that the value, $F*2^{-K}$ is greater than or equal to one and less than two.

If the operand in operand buffer 800B is in a zero format, underflow format, overflow format, infinity format, or NaN format, the scaling unit 120 may scale the operand in operand buffer 800B by a scale factor that equals a binary one. Accordingly, the processing circuit 820 may provide signals representative of a binary zero (i.e., K=0) to the result generator 830.

If the operand in operand buffer 800B is in a normalized non-zero format, the value of the fraction of the floating point operand may already be greater than or equal to one and less than two. Therefore, the scaling unit 120 may scale the operand in operand buffer 800B by a scale factor that corresponds to the value represented by the exponent field of the operand. Accordingly, the processing circuit 820 may provide signals to the result generator 830 representative of a scale factor, K, that corresponds to the value represented by the exponent field of the operand.

If the operand in operand buffer 800B is in a denormalized format, the scaling unit 120 may scale the operand by a scale factor that corresponds to the number of leading zeros in the fraction field. The number of leading zeros equals the number, a, of fraction field bits, $f_{msb} \ldots f_{msb-a+1}$ before the first bit $f_{msb-a}$ that has the value one. Accordingly, the processing circuit 820 may provide signals to the result generator 830 representative of a scale factor, K, that corresponds to the number of leading zeros in the fraction field of the operand in operand buffer 800B.

If the operand in operand buffer 800B is in a delimited format, the processing circuit 820 may provide signals to the result generator 830 representative of a scale factor, K, that corresponds to the number of trailing zeroes in the fraction field of the operand in operand buffer 800B.

The result generator 830 receives signals representative of the integer operand in operand buffer 800A and signals representative of the scale factor, K, from the processing circuit 820 and generates a result equal to the sum of the integer operand 800A and K. The integer operand, J, may be in two's complement form. The integer K generated by processing circuit 820 may also be in two's-complement form. The result generator 830 may subtract the operand J and the integer K to produce the sum, which represents "J+K" in two's complement form.

Figure 9:
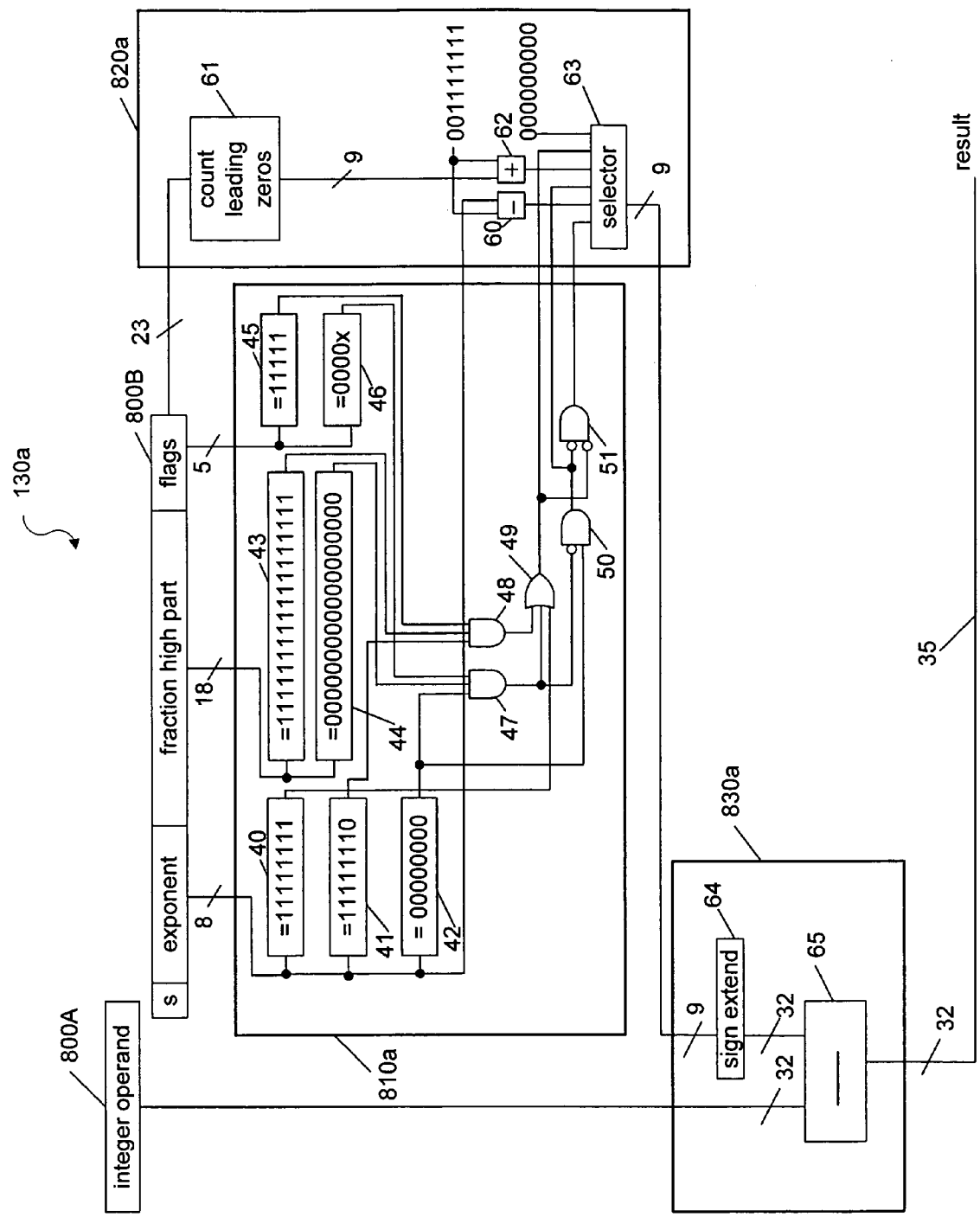
FIG. 9 illustrates a functional block diagram of a first exemplary running sum unit according to an embodiment of the present invention.

FIG. 9 illustrates an exemplary embodiment of a running sum unit 130a that may be used when the floating point operand stored in the operand buffer 800B may be in a format according to U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application. The running sum unit 130*a* may comprise an operand analysis circuit 810*a*, a processing circuit 820*a*, and a result generator 830*a*.

The operand analysis circuit 810*a* may determine the format of the operand in operand buffer 800B using comparators 40–46 and combinatorial logic elements 47–51. The operand analysis circuit 810*a* operates in a manner similar to operand analysis circuit 310*a* of FIG. 4, except that operand analysis circuit 810*a* comprises an additional NAND gate 51. The NAND gate 51 generates an asserted signal if the operand in operand buffer 800B is in the normalized non-zero format 1340.

The processing circuit 820*a* may comprise a subtraction circuit 60, a count leading zeros circuit 61, an adder circuit 62, and a selector circuit 63. The subtraction circuit 60 receives signals representative of the exponent field bits, $e_{msb} \ldots e_{lsb}$, of the operand and generates output signals representing the difference between the value of the exponent field and the value of an exponent bias value. For IEEE Std. 754, the value of the exponent bias is represented by the bit pattern 001111111. Accordingly, the subtraction circuit 60 may generate output signals representing the difference between the value of the exponent field of the operand and the value represented by the bit pattern 001111111. The output signals of the subtraction circuit 60 represent the scale factor, K, for the operand in operand buffer 800B, in two's complement, if the operand in operand buffer 800B is in the normalized non-zero format 1340.

The count leading zeros circuit 61 generates signals representing the number of leading zeros in the fraction field of the operand in operand buffer 800B. The addition circuit 62 receives the signals generated by the count leading zeros circuit 61 and generates output signals that represent the sum of the value represented by the signals from the count leading zeros circuit 61 and the value represented by the bit pattern 001111111. The output signals of the adder circuit 62 represents the scale factor, K, in two's complement, for the operand in operand buffer 800B, if the operand is in the denormalized format 1330.

The selector circuit 63 selectively couples signals from one of the subtraction circuit 60, the adder circuit 62, or signals representing a binary zero, to the result generator 830*a*, based on the format of the operand in operand buffer 800B. If the operand analysis circuit 810*a* indicates that the operand in operand buffer 800B is in the normalized non-zero format 1340 (i.e., if NAND 51 generates an asserted signal), the selector circuit 63 couples the signals from the subtraction circuit 60 to the result generator 830*a*. If the operand analysis circuit 810*a* indicates that the operand in operand buffer 800B is in the denormalized format 1330 (i.e., if gate 50 generates an asserted signal), the selector circuit 63 couples the signals from the adder circuit 62 to the result generator 830*a*. Finally, if the operand analysis circuit 810*a* indicates that the operand in operand buffer 800B is the zero format 1310, underflow format 1320, overflow format 1350, infinity format 1360, or NaN format 1370 (i.e., if OR gate 49 generates an asserted signal), the selector circuit 63 couples the signals representing a binary zero to the result generator 830*a*. The output signals provided by the selector circuit 63 represent, in two's-complement format, the scale factor, K, that is used by scaling unit 120 to process operand in operand buffer 800B.

The result generator 830*a* may comprise a sign extender circuit 64 and a subtraction circuit 65. The sign extender circuit 64 receives the signals provided by the processing circuit 820*a* and performs a sign extension operation. The subtraction circuit 65 may receive the signals representing the integer operand in operand buffer 800A and the signals generated by the sign extender circuit 64, both in two's complement form, and generate signals representative of their difference. The result is coupled to result bus 35.

Figure 10:
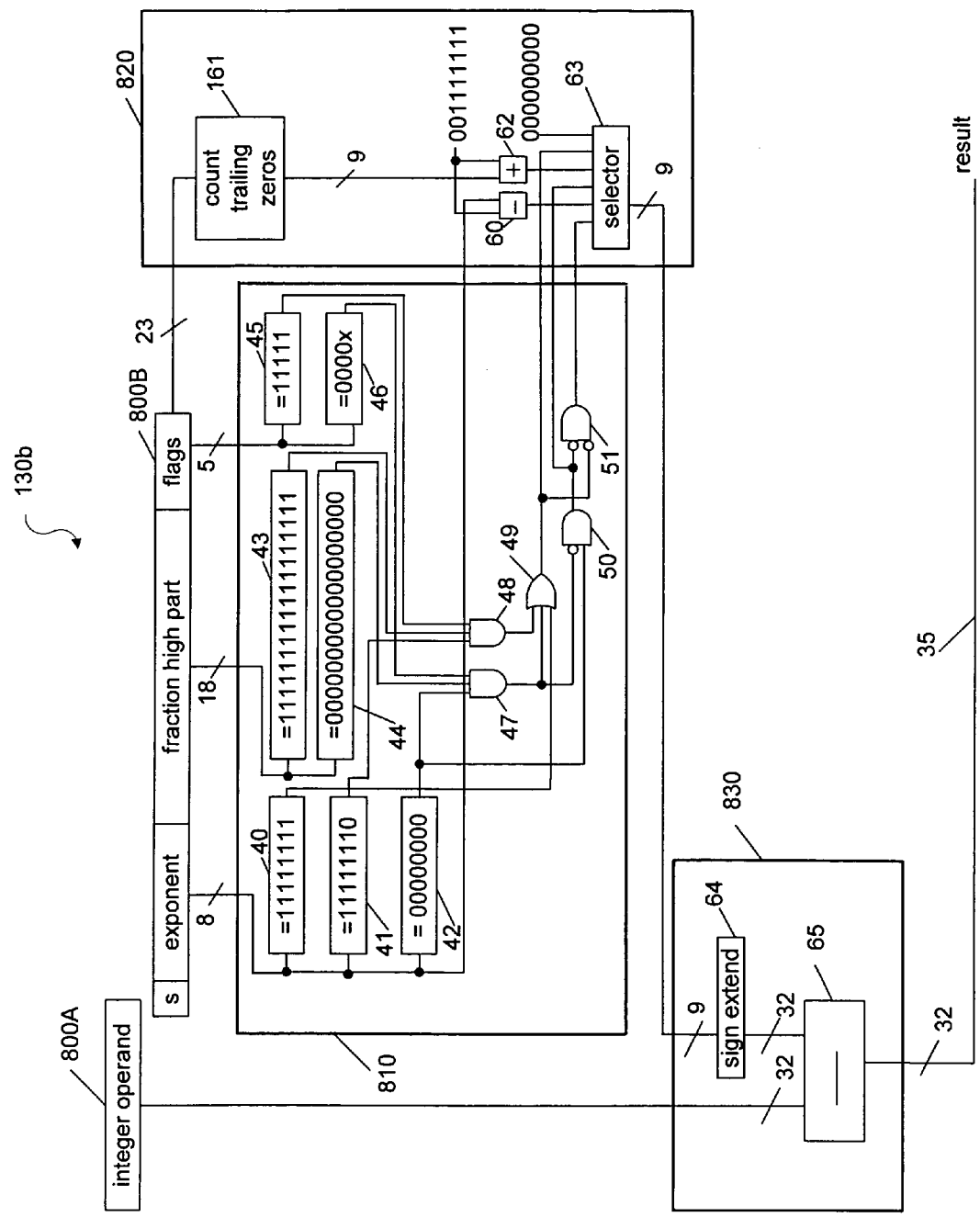
FIG. 10 illustrates a functional block diagram of a second exemplary running sum unit according to an embodiment of the present invention.

FIG. 10 illustrates an exemplary embodiment of a running sum unit 130*b* that may be used when the floating point operand stored in the operand buffer 800B may be in a format according to U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, but, instead of the denormalized format 1330, the operand may be in a delimited format according to U.S. Pat. No. 6,131,106. The running sum unit 130*b* is identical to the running sum unit 130*a* described above, except that running sum unit 130*b* includes a count trailing zeros circuit 161 instead of a count leading zeros circuit 61. More specifically, the count trailing zeros circuit 161 generates output signals representing the number n, where n equals the number of bits equal to zero to the right of the delimiter flag. Otherwise, the running sum unit 130*b* operates in the same manner as running sum unit 130*a*.

Figure 11:
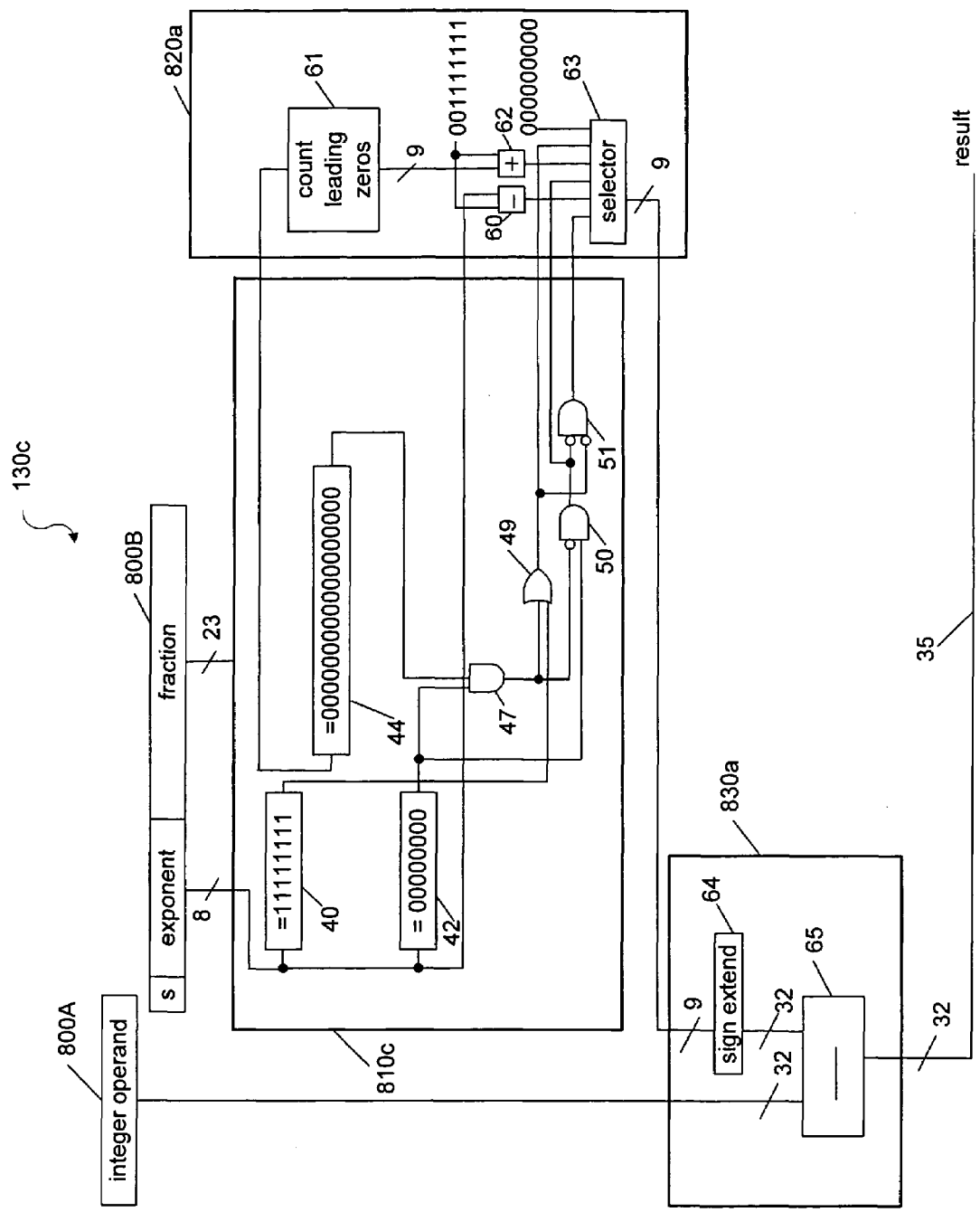
FIG. 11 illustrates a functional block diagram of a third exemplary running sum unit according to an embodiment of the present invention.
Figure 12:
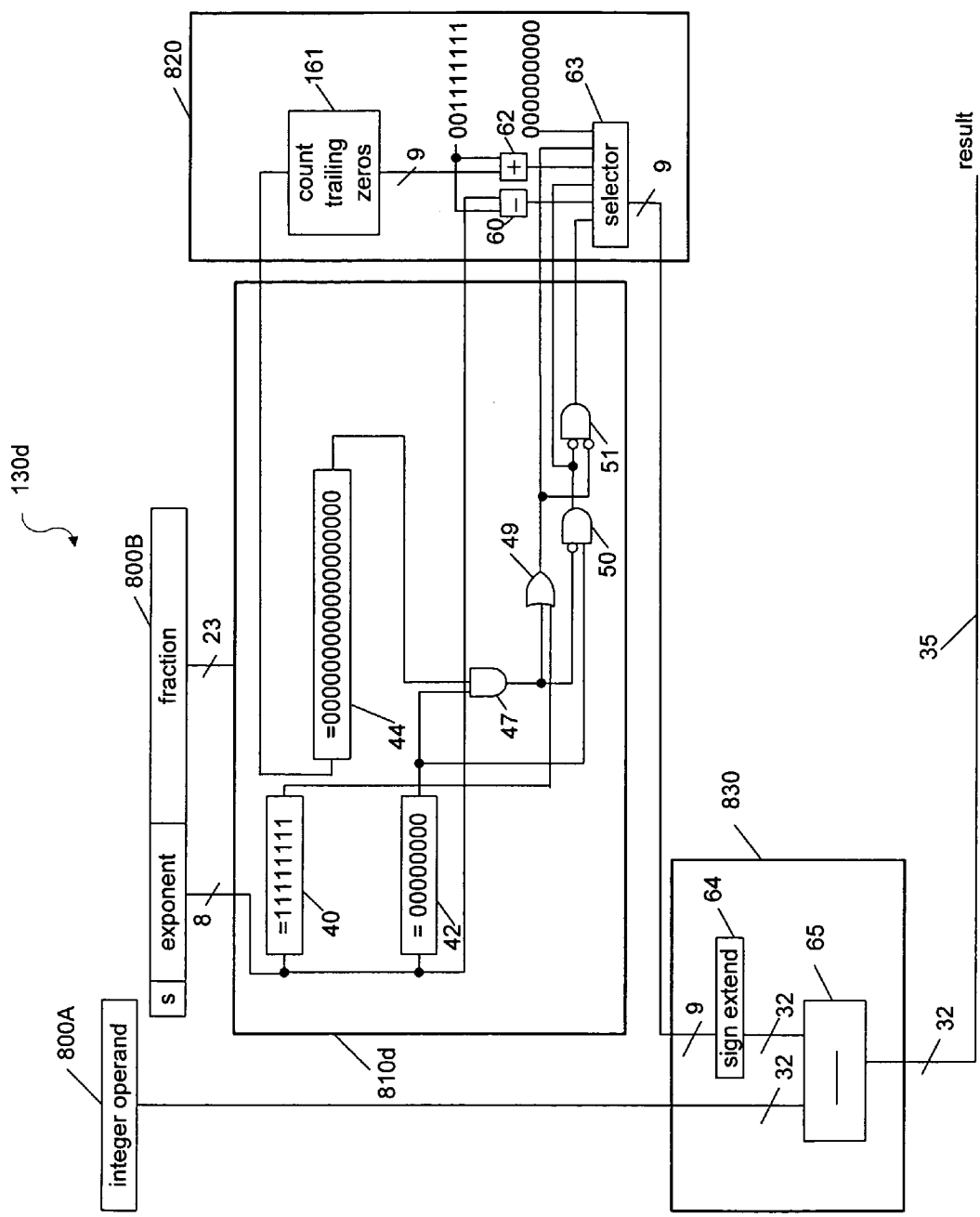
FIG. 12 illustrates a functional block diagram of a fourth exemplary running sum unit according to an embodiment of the present invention.

FIG. 11 illustrates an exemplary embodiment of a running sum unit 130*c* that may be used when the floating point operand stored in the operand buffer 800B may be in a format according to IEEE Std. 754. FIG. 12 illustrates an exemplary embodiment of a running sum unit 130*d* that may be used when the floating point operand stored in the operand buffer 800B may be in a format according to IEEE Std. 754, but, instead of the denormalized format, the operand may be in a delimited format according to U.S. Pat. No. 6,131,106.

The running sum units 130*c* and 130*d* are generally similar to running sum units 130*a* and 130*b*, respectively, except that comparators 41, 43, 45, and 46 and logic element 48 have been removed in the operand analysis circuits 810*c* and 810*d* because there is no underflow 1320 and overflow 1350 format in IEEE Std. 754 and no status flag information stored in the operand in IEEE Std. 754.

The above description of the extended exponent floating point unit 100 assumes 32-bit floating point operands. However, those skilled in the art will appreciate that the extended exponent floating point unit 100 may be adapted to receive a floating point operand having any number of bits. For example, the extended exponent floating point unit 100 may be adapted to receive 64-bit floating-point operands 300B and 800B. Adapting the extended exponent floating point unit 100 to receive a floating point operand having any number of bits will be obvious to those of ordinary skill in the art.

Further, the above description of the extended exponent floating point unit 100 has been described with reference to operands according to U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, U.S. Pat. No. 6,131,106, and IEEE Std. 754. However, those skilled in the art will appreciate that the extended exponent floating point unit 100 may be adapted to receive a floating point operand having a different format. Adapting the extended exponent floating point unit 100 to receive a floating point operand having a different format will be obvious to those of ordinary skill in the art.

Still further, the extended exponent floating point unit 100 and all or part of its functionality may be implemented in software, firmware, hardware, or any combination thereof. For example, the invention may be practiced in an electrical circuit comprising discrete electronic elements, packaged or integrated electronic chips containing logic gates, a circuit utilizing a microprocessor, or on a single chip containing electronic elements or microprocessors. It may also be provided using other technologies capable of performing logical operations such as, for example, AND, OR, and NOT, including but not limited to mechanical, optical, fluidic, and quantum technologies. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements which may be connected directly to the system or which may transfer the information to the system over a network or other mechanism for transferring information in a conventional manner.

Finally, the scaling unit and the running sum unit may be included as functional units of the floating point units disclosed in U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for performing an extended exponent floating point operation on a plurality of operands to produce a product of the plurality of operands, the method comprising:
    grouping the plurality of operands into at least one group;
    determining a plurality of scale factors for the plurality of operands, respectively, and providing a running sum of the plurality of scale factors;
    scaling the plurality of operands to obtain a plurality of scaled operands;
    multiplying the plurality of scaled operands to obtain a group product and scaling the group product to obtain a scaled group product; and
    adjusting the scaled group product based on the running sum,
    wherein the plurality of operands are grouped such that when all the plurality of scaled operands in the at least one group are multiplied an overflow or underflow will not occur.

2. The method according to claim 1, wherein at least one of the plurality of scaled operands is greater than or equal to one and less than two.

3. The method according to claim 1, wherein determining the plurality of scale factors comprises determining at least one scale factor of the plurality of scale factors based on a format of at least one corresponding operand of the plurality of operands.

4. The method according to claim 3, wherein determining at least one scale factor of the plurality of scale factors comprises:
    determining the format of the corresponding operand of the plurality of operands;
    setting the at least one scale factor to zero if the format is a zero format, an underflow format, an overflow format, an infinity format, or a NaN format;
    setting the at least one scale factor based on exponent field bits of the corresponding operand if the format is a normalized non-zero format;
    setting the at least one scale factor based on a number of leading zeros in a fraction field of the corresponding operand if the format is a denormalized format; and
    setting the at least one scale factor based on a number of trailing zeros in the fraction field of the corresponding operand if the format is a delimited format.

5. The method according to claim 1, wherein at least one operand of the plurality of operands is scaled based on a format of the at least one operand.

6. The method according to claim 5, wherein scaling the at least one operand comprises:
    determining the format of the at least one operand;
    setting exponent field bits of the at least one operand to a predetermined bit pattern if the format of the at least one operand is one of the group of a normalized non-zero format, a denormalized format, and a delimited format;
    maintaining the exponent field bits and fraction field bits of the at least one operand if the format of the at least one operand is a zero format, an underflow format, an overflow format, an infinity format, or a NaN format;
    normalizing the fraction field bits of the at least one operand if the format of the at least one operand is a denormalized format; and
    maintaining the fraction field bits of the at least one operand, except a delimiter bit, which is set equal to zero, if the format of the at least one operand is a delimited format.

7. The method according to claim 1, wherein at least one operand of the plurality of operands stores status information wherein the status information is preserved in the product.

8. A computer-readable medium on which is stored a set of instructions for performing an extended exponent floating point operation on a plurality of operands to produce a product of the plurality of operands, which when executed performs steps comprising:
    grouping the plurality of operands into at least one group;
    determining a plurality of scale factors for the plurality of operands, respectively, and providing a running sum of the plurality of scale factors;
    scaling the plurality of operands to obtain a plurality of scaled operands;
    multiplying the plurality of scaled operands to obtain a group product and scaling the group product to obtain a scaled group product; and
    adjusting the scaled group product based on the running sum,
    wherein the plurality of operands are grouped such that when all the plurality of scaled operands in the at least one group are multiplied an overflow or underflow will not occur.

9. The computer-readable medium according to claim 8, wherein at least one of the plurality of scaled operands is greater than or equal to one and less than two.

10. The computer-readable medium according to claim 8, wherein determining the plurality of scale factors comprises determining at least one scale factor of the plurality of scale factors based on a format of at least one corresponding operand of the plurality of operands.

11. The computer-readable medium according to claim 10, wherein determining at least one scale factor of the plurality of scale factors comprises:
  determining the format of the corresponding operand of the plurality of operands;
  setting the at least one scale factor to zero if the format is a zero format, an underflow format, an overflow format, an infinity format, or a NaN format;
  setting the at least one scale factor based on exponent field bits of the corresponding operand if the format is a normalized non-zero format;
  setting the at least one scale factor based on a number of leading zeros in a fraction field of the corresponding operand if the format is a denormalized format; and
  setting the at least one scale factor based on a number of trailing zeros in the fraction field of the corresponding operand if the format is a delimited format.

12. The computer-readable medium according to claim 8, wherein at least one operand of the plurality of operands is scaled based on a format of the at least one operand.

13. The computer-readable medium according to claim 12, wherein scaling the at least one operand comprises:
  determining the format of the at least one operand;
  setting exponent field bits of the at least one operand to a predetermined bit pattern if the format of the at least one operand is one of the group of a normalized non-zero format, a denormalized format, and a delimited format;
  maintaining the exponent field bits and fraction field bits of the at least one operand if the format of the at least one operand is a zero format, an underflow format, an overflow format, an infinity format, or a NaN format;
  normalizing the fraction field bits of the at least one operand if the format of the at least one operand is a denormalized format; and
  maintaining the fraction field bits of the at least one operand, except a delimiter bit, which is set equal to zero, if the format of the at least one operand is a delimited format.

14. The computer-readable medium according to claim 8, wherein at least one operand of the plurality of operands stores status information wherein the status information is preserved in the product.

15. A system for performing an extended exponent floating point operation on a plurality of operands to produce a product of the plurality of operands, the system comprising:
  a running sum unit for determining a corresponding scale factor for each of the plurality of operands based on a format of the operand and computing a running sum of the scale factors;
  a scaling unit for scaling each of the plurality of operands to obtain a plurality of scaled operands based on a format of the operand and computing a running product of the scaled plurality of operands; and
  a control module for receiving the running sum from the running sum unit and the running product from the scaling unit and adjusting the running product based on the running sum, wherein the control module provides the plurality of operands to the running sum unit and to the scaling unit and wherein the control module provides the running sum calculated in a previous iteration to the running sum unit during a subsequent iteration and wherein the control module provides the running product calculated in the previous iteration to the scaling unit during the subsequent iteration.

16. The system according to claim 15, wherein at least one operand of the plurality of operands stores status information and the scaling unit preserves the status information in the corresponding scaled operand.

17. The system according to claim 15, wherein the running sum unit comprises:
  an operand analysis circuit for determining for each of the plurality of operands a corresponding format; and
  a processing circuit for determining for each of the plurality of operands a corresponding scale factor based on the corresponding format.

18. The system according to claim 15, wherein the scaling unit comprises:
  an operand analysis circuit for determining for each of the plurality of operands a corresponding format; and
  a processing circuit for scaling each of the plurality of operands based on the corresponding format.

19. A method for scaling a floating point operand to obtain a scaled floating point operand comprising:
  determining a format of the floating point operand;
  setting exponent field bits of the floating point operand to a predetermined bit pattern if the format of the floating point operand is one of the group of a normalized non-zero format, a denormalized format, and a delimited format;
  maintaining the exponent field bits and fraction field bits of the floating point operand if the format of the floating point operand is a zero format, an underflow format, an overflow format, an infinity format, or a NaN format;
  normalizing the fraction field bits of the floating point operand if the format of the floating point operand is a denormalized format; and
  maintaining the fraction field bits of the floating point operand, except a delimiter bit, which is set equal to zero, if the format of the floating point operand is a delimited format.

20. The method according to claim 19, wherein the floating point operand stores status information wherein the status information is preserved in the scale floating point operand.

21. A method for determining a scale factor of a floating point operand wherein when the floating point operand is multiplied by the scale factor the resulting scaled floating point operand is within a predetermined range, the method comprising:
  determining a format of the floating point operand;
  setting the scale factor to zero if the format is a zero format, an underflow format, an overflow format, an infinity format, or a NaN format;
  setting the scale factor based on exponent field bits of the floating point operand if the format is a normalized non-zero format;
  setting the scale factor based on a number of leading zeros in a fraction field of the floating point operand if the format is a denormalized format; and
  setting the scale factor based on a number of trailing zeros in the fraction field of the floating point operand if the format is a delimited format.

22. A computer-readable medium on which is stored a set of instructions for scaling a floating point operand to obtain a scaled floating point operand, which when executed performs steps comprising:
  determining a format of the floating point operand;
  setting exponent field bits of the floating point operand to a predetermined bit pattern if the format of the floating point operand is one of the group of a normalized non-zero format, a denormalized format, and a delimited format;

maintaining the exponent field bits and fraction field bits of the floating point operand if the format of the floating point operand is a zero format, an underflow format, an overflow format, an infinity format, or a NaN format;

normalizing the fraction field bits of the floating point operand if the format of the floating point operand is a denormalized format; and maintaining the fraction field bits of the floating point operand, except a delimiter bit, which is set equal to zero, if the format of the floating point operand is a delimited format.

23. A computer-readable medium on which is stored a set of instructions for determining a scale factor of a floating point operand wherein when the floating point operand is multiplied by the scale factor the resulting scaled floating point operand is within a predetermined range, which when executed performs steps comprising:

determining a format of the floating point operand;

setting the scale factor to zero if the format is a zero format, an underflow format, an overflow format, an infinity format, or a NaN format;

setting the scale factor based on exponent field bits of the floating point operand if the format is a normalized non-zero format;

setting the scale factor based on a number of leading zeros in a fraction field of the floating point operand if the format is a denormalized format; and setting the scale factor based on a number of trailing zeros in the fraction field of the floating point operand if the format is a delimited format.

* * * * *

UNITED STATES PATENT AND TRADEMARK OFFICE
CERTIFICATE OF CORRECTION

PATENT NO. : 6,993,549 B2
APPLICATION NO. : 10/035581
DATED : January 31, 2006
INVENTOR(S) : Guy L. Steele, Jr.

It is certified that error appears in the above-identified patent and that said Letters Patent is hereby corrected as shown below:

<u>Title page,</u>
Item [54], Title, "GLOATING" should read -- FLOATING --.

Signed and Sealed this

Twentieth Day of June, 2006

JON W. DUDAS
*Director of the United States Patent and Trademark Office*